(12) United States Patent
Jackson et al.

(10) Patent No.: US 10,025,873 B2
(45) Date of Patent: *Jul. 17, 2018

(54) SYSTEM AND METHOD FOR STORING AND PROCESSING DATABASE REQUESTS

(71) Applicant: Walmart Apollo, LLC, Bentonville, AR (US)

(72) Inventors: Richard Jackson, Bentonville, AR (US); John R. Frerking, Prairie Grove, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 388 days.

This patent is subject to a terminal disclaimer.

(21) Appl. No.: 14/689,493

(22) Filed: Apr. 17, 2015

(65) Prior Publication Data

US 2015/0302037 A1 Oct. 22, 2015

Related U.S. Application Data

(60) Provisional application No. 61/981,318, filed on Apr. 18, 2014.

(51) Int. Cl.
*G06F 7/00* (2006.01)
*G06F 17/30* (2006.01)
*H04L 29/08* (2006.01)

(52) U.S. Cl.
CPC ........ *G06F 17/30893* (2013.01); *H04L 67/02* (2013.01)

(58) Field of Classification Search
CPC .... G06F 21/6218; G06F 21/629; G06F 21/53; G06F 2221/2149
See application file for complete search history.

(56) References Cited

U.S. PATENT DOCUMENTS

| | | |
|---|---|---|
| 6,611,498 B1 | 8/2003 | Baker et al. |
| 7,165,116 B2 | 1/2007 | Grove et al. |
| 7,349,871 B2 | 3/2008 | Labrou et al. |

(Continued)

OTHER PUBLICATIONS

International Search Report and Written Opinion for Application No. PCT/US2014/049966, dated Nov. 6, 2014. 6 pages.

(Continued)

*Primary Examiner* — Tuan A Pham
(74) *Attorney, Agent, or Firm* — McCarter & English, LLP; David R. Burns

(57) ABSTRACT

A system is provided that is adapted to service web-based database service requests. In one implementation, a database service is provided for servicing web-originated service requests. In one implementation, virtual computer systems may be used to service requests in a more reliable manner. Different operating modes may be configured for backup redundancy and the database service may be scaled to meet service requests for a particular application. Also, methods are provided for exchanging timestamp information among web service transaction systems to reduce the amount of processing capability and bandwidth for ensuring database consistency. Further, a NoSQL Key/Value (KVS) database is provided that provides one or more features that may be beneficial for cloud service, Internet-based, and other types of database applications.

68 Claims, 13 Drawing Sheets

(56) References Cited

U.S. PATENT DOCUMENTS

| | | |
|---|---|---|
| 7,801,826 B2 | 9/2010 | Labrou et al. |
| 7,865,584 B2 | 1/2011 | Grossner et al. |
| 8,219,676 B2 | 7/2012 | Jagadish et al. |
| 8,271,430 B2 | 9/2012 | Willson |
| 8,938,636 B1 | 1/2015 | Hochschild et al. |
| 9,055,139 B1 | 6/2015 | Devireddy et al. |
| 9,336,265 B2 | 5/2016 | Frerking |
| 2003/0041227 A1 | 2/2003 | Nakamatsu |
| 2003/0065941 A1 | 4/2003 | Ballard et al. |
| 2004/0098350 A1 | 5/2004 | Labrou et al. |
| 2004/0107170 A1 | 6/2004 | Labrou et al. |
| 2004/0205099 A1 | 10/2004 | Hagiwara |
| 2004/0213387 A1 | 10/2004 | Chandrasekaran |
| 2005/0027543 A1 | 2/2005 | Labrou et al. |
| 2005/0028024 A1 | 2/2005 | Kataoka et al. |
| 2005/0044197 A1 | 2/2005 | Lai |
| 2005/0050112 A1 | 3/2005 | Chandrasekaran |
| 2005/0198200 A1 | 9/2005 | Subramanian et al. |
| 2006/0165040 A1 | 7/2006 | Rathod et al. |
| 2006/0195607 A1 | 8/2006 | Naseh et al. |
| 2007/0203944 A1 | 8/2007 | Batra et al. |
| 2007/0282858 A1 | 12/2007 | Arner et al. |
| 2008/0082623 A1 | 4/2008 | Michael et al. |
| 2008/0235298 A1 | 9/2008 | Lin et al. |
| 2009/0043881 A1 | 2/2009 | Alstad |
| 2009/0113531 A1 | 4/2009 | Emmerich et al. |
| 2009/0132543 A1* | 5/2009 | Chatley ................ G06F 3/0613 |
| 2009/0240735 A1* | 9/2009 | Grandhi ................ G06Q 30/02 |
| 2009/0287746 A1 | 11/2009 | Brown |
| 2009/0299987 A1 | 12/2009 | Willson |
| 2009/0327098 A1 | 12/2009 | Ronen et al. |
| 2010/0198972 A1* | 8/2010 | Umbehocker ........ G06F 3/0604 709/226 |
| 2010/0299553 A1 | 11/2010 | Cen |
| 2010/0325371 A1 | 12/2010 | Jagadish et al. |
| 2011/0038633 A1 | 2/2011 | DeCusatis et al. |
| 2011/0131197 A1 | 6/2011 | Nielsen et al. |
| 2011/0138027 A1 | 6/2011 | Friedmann et al. |
| 2011/0208695 A1 | 8/2011 | Anand et al. |
| 2012/0226712 A1 | 9/2012 | Vermeulen et al. |
| 2012/0278335 A1* | 11/2012 | Bentkofsky ....... G06F 17/30327 707/743 |
| 2012/0291099 A1* | 11/2012 | Grube ................ H04L 67/1097 726/3 |
| 2013/0174223 A1 | 7/2013 | Dykeman et al. |
| 2013/0185716 A1 | 7/2013 | Yin et al. |
| 2013/0318191 A1 | 11/2013 | Yin et al. |
| 2014/0211793 A1 | 7/2014 | Mital et al. |
| 2015/0046511 A1 | 2/2015 | Frerking |

OTHER PUBLICATIONS

International Preliminary Report on Patentability for Application No. PCT/US2014/049966, dated Feb. 18, 2016. 6 pages.

International Search Report and Written Opinion for Application No. PCT/US2014/049976, dated Nov. 6, 2014. 8 pages.

International Preliminary Report on Patentability for Application No. PCT/US2014/049976, dated Feb. 18, 2016. 8 pages.

Non-Final Office Action for U.S. Appl. No. 13/960,192, dated Oct. 21, 2015. 17 pages.

Final Office Action for U.S. Appl. No. 13/960,266, dated Oct. 5, 2015. 15 pages.

Notice of Allowance for U.S. Appl. No. 13/960,266, dated Jan. 8, 2016. 12 pages.

* cited by examiner

SYSTEM AND METHOD FOR STORING AND PROCESSING DATABASE REQUESTS

RELATED APPLICATIONS

This application claims priority to and benefit of U.S. Provisional Patent Application No. 61/981,318, filed Apr. 18, 2014, the disclosure of which is incorporated herein by reference in its entirety.

BACKGROUND

There are many different methods for processing database requests, and many different types of database systems that can be used for storing and retrieving data, particularly for Internet-based applications.

SUMMARY

According to one aspect, it is appreciated that it may be useful and particularly advantageous to provide a system that is capable of servicing one or more web-based database service requests. According to one embodiment, a platform is provided that allows web-based service requests to be processed in a more reliable manner. For instance, a database service may be provided that is capable of storing and tracking received requests, and responsive to failures, the distributed computer system is capable of transitioning those service requests to other distributed computer system resources. Conventionally, systems that fail during the processing of web-based requests generally do not fail gracefully, and service errors occur as a result.

Further, it would be beneficial to have a web-based service is capable of being scaled depending on particular clients or applications. For instance, a cloud-based platform may be provided that hosts database applications that support multiple users, and each service for a particular provider may be tailored to meet the needs of the application. According to various embodiments, the database service that is provided to support such applications may be adjusted to support certain fault tolerance levels, response times, failover scenarios, and data replication and backup requirements. Optimally, the database service exhibits high-performance, is highly available, efficient, reliable, scalable and cost-effective.

According to one embodiment, the database service may be configured in one of a number of different environments. For instance, the database service may be configured as an active/single environment where a single database service entity responds to one or more web-service requests. In another environment, a database service may be configured as an active/active environment where two or more database service entities receive and respond to one or more web service requests. In yet another implementation, a database service may be configured as an active/standby where two or more database service entities receive one of the web service requests, but a single entity is responsible for committing transactions.

It is appreciated such a system to beneficial when implementing one or more data centers that include systems that serve as backup systems that respond to service web-service requests. For instance, active/active configurations may be used to cache across multiple data centers for the purpose of performing synchronous replication. In another example, active/standby configurations may be used to cash requests across multiple data centers for the purpose of performing asynchronous replication to a "hot" standby data center.

According to another embodiment, the database system and support REST and SOAP service calls. According to another embodiment of the present invention, a database system supports HTTP and HTTPS service calls. In another embodiment, the service calls may be encrypted (e.g., via SSL/TLS encryption). In one embodiment, the service requests may include commands such as POST, GET, PUT and DELETE requests. In one implementation, basic security may be provided for REST service requests (e.g., by providing support for userid/password authentication and authentication using RACF). In one implementation, basic security may be provided for SOAP service requests (e.g., by providing support for userid/password authentication using SOAP header, and authentication using RACF).

According to one aspect of the present invention, a NoSQL, Key/Value Store (KVS) database may be provided. The database may be used to store any type of information or data objects, including, but not limited to transaction data, inventory data, data objects, images, documents, or other information type in any number and types of formats (e.g., text, GIF, JPEG, PDF, XML, JSON, among others). In one implementation, such a database may be designed to be a cloud-based service, although any database implementation may be used. In one specific implementation, the database may be provided on the well-known zEnterprise platform provided by IBM, including, but not limited to IBM hardware (e.g., within clusters or groups of CICS servers) and software systems (e.g., z/OS software). However, it should be appreciated that other hardware and software systems may be used. In one embodiment, a NoSQL, Key/Value Store (KVS) database may be provided that has transactional integrity and is ACID compliant.

According to various aspects of the present invention, the database (e.g., a NoSQL, Key/Value Store (KVS) database) may have one or more of the following features, either alone or in combination with one or more other features. For instance, the database may be configurable to operate in one of two modes, referred to herein as basic mode and query mode. In basic mode, access to the database may be performed using a full or precise key. For instance, a REST or SOAP POST, GET, PUT, or DELETE request accesses a row of information. Access to data may be performed based on user information and security information for row and field-level access. Basic mode may also be used to browse a database table sequentially by using a full or generic key. Also, the key may be used along with a request type (e.g., indicated within a query string) to access the data in a particular way. In another implementation, a basic mode with a read only option may be provided that allows access to data (e.g., by GET requests) using HTTP without the need for a username or password.

Further, according to one aspect of the present invention, the ability may be provided to set record retention within the database at a row level. In one implementation, this is accomplished through the basic mode of operation. For instance, using a POST or PUT request may include an option to specify a retention period or time-to-live (TTL). Thus, an application may control how long a particular entry lives within the database.

In another aspect of the invention, users may define views of fields within the database. For instance, a user may define a set of fields associated with a view name that may be referenced in query commands.

In yet another aspect of the present invention, an offload query feature may be provided that allows for complex queries, table scans, and other database functions to be performed asynchronously. For instance, results may generated asynchronously and made available to applications to use (e.g., in a distributed application of a cloud-based application). In one example, a request may initiate a returned response which includes a reference to an output file that contains a query result.

In yet other aspects of the present invention, other database features are provided. For instance, special SELECT options are provided for performing a variety of desired functions, such as controlling whether duplicate rows are returned, controlling whether results are provided synchronously or asynchronously, sorting results not based on a primary key, among other options. In another embodiment, table JOIN operations are permitted to query and update data distributed among tables.

In yet another embodiment, a distributed method for updating timestamp information related to stored data is provided. For instance, it is appreciated that timestamp information for data may need to be made consistent across multiple datasets (e.g., located at different datacenters). It is realized that in high-volume transaction systems, it may not be feasible to adequately transmit timestamp information in an effective manner between systems. For instance, excessive network traffic would be created by synchronizing such timestamp information created by multiple updates and data accesses. Therefore, it is appreciated that it would be preferable to permit timestamp updates that minimize network traffic. Further, a capability may be provided that permits timestamp information to be maintained for a data element based on when the data was last accessed. For instance, most data elements only information that identified when a data element was last updated, not when it was last accessed.

According to one aspect, a system for processing database requests is provided. The system comprises a server configured to receive and process database requests, the server comprising a plurality of components comprising a plurality of virtual computer systems adapted to service received database requests; a logical storage system coupled to the plurality of virtual computer systems, wherein each of the plurality of virtual computer systems shares a common storage that is adapted to store the received database requests; and a request handler element adapted to distribute a database request to at least one of the plurality of virtual computer systems for processing. In one embodiment, the database requests include at least one of a group comprises a REST service request; and a SOAP service request. In one embodiment, the database requests include at least one of a group of requests comprises a POST request; a GET request; a PUT request; and a DELETE request. In one embodiment, the database is accessed in a read-only mode wherein the GET request is accessed using HTTP without a username/password information. In one embodiment the database is accessed responsive to the database requests using HTTPS and SSL/TLS.

According to one aspect, in one embodiment, the server configured to receive and process database requests is operable in at least one of a group of operating modes. The group comprises an active/single mode; an active/standby mode; and an active/active mode. In one embodiment, the server configured to receive and process database requests is operable in at least one of a group of operating modes, the group comprises a basic mode; and a query mode. In one embodiment, in the basic mode, access to a row of information in the database is performed using a full key value. In one embodiment, in the basic mode, a table is browsed sequentially using a full or generic key value. In one embodiment, the database request includes a request type identifier. In one embodiment, the request type identifier includes at least one of a group of request type identifiers, the group comprises an indicator that specifies that the database request includes a precise key; and an indicator that specifies that the database request includes a generic key. In one embodiment, the indicator that specifies that the database request includes the generic key indicates that database records retrieved from the database, specifies at least one of a group of a plurality of operators, the group of operators comprises a greater than or equal to relationship operator; a greater than relationship operator; a less than or equal to relationship operator; and a less than relationship operator.

In one embodiment, the system includes a component that is configured to return a key of an actual record responsive to the full or generic key value. In one embodiment, the component that is configured to return the key of the actual record responsive to the full or generic key value returns the key of the actual record within an HTTP status text field. In one embodiment, The system further comprises a component adapted to set record retention at a row level. In one embodiment the component adapted to set record retention at a row level is responsive to a specification of a time to live value within the database request. In one embodiment, the system further comprises a component configured to return a set of database fields from the database responsive to a view indicator defining the set of database fields. In one embodiment, the view information is specified within at least one of the plurality of received database requests. In one embodiment, the system further comprises a component configured to set record retention at a row level of the database. In one embodiment, record retention information is specified within at least one of the plurality of received database requests.

In one embodiment, the system further comprises a component configured to set security at a field level of the database. In one embodiment the database includes a data structure specifying one or more users having field level access to information stored in the database. In one embodiment, the database is adapted to control access to the database responsive to the received database requests at a field level of the database based on one or more user identifiers. In one embodiment, the system further comprises a component configured to perform a query of the database in an offload processing mode responsive to an indicator defining the offload processing mode. In one embodiment, the system further comprises a component responsive to a database request that does not specify a table name. In one embodiment, the system further comprises a component responsive to a database request that joins information from a specified table.

In one embodiment, the system further comprises a component responsive to a trigger event that defines a database operation. In one embodiment, the component responsive to the trigger event may perform at least one of a group comprising a synchronization of data with another database service, a logging of data to a logging service, a receipt of information to the database, and a publication of data to an external destination. In one embodiment, the trigger event may be specified as a synchronous or an asynchronous operation.

In one embodiment, record retention information is specified within at least one of the plurality of received database requests. In one embodiment, the database is a NoSQL key/value store database. In one embodiment, the system further comprises a load balancing element adapted to distribute the database requests among a plurality of server systems. In one embodiment, the plurality of virtual computer systems are located within a partition. In one embodiment, a database application is assigned to a particular partition. In one embodiment, the system further comprises transaction server components that are adapted to process database transactions.

In one embodiment, the logical storage system further comprises a common database shared by the plurality of virtual servers upon which database requests are transacted. In one embodiment, the system comprises an entity that monitors an expiration of a database record associated with at least one database request. In one embodiment, the system further comprises corresponding entities that execute among at least two of the plurality of virtual computer systems, the entities being adapted to compare timestamps associated with the database record associated with the at least one database request. In one embodiment, the entity is adapted to delete the database record associated with the at least one database request. In one embodiment, the at least two of the plurality of virtual computer systems execute within separate computer systems. In one embodiment, at least two of the virtual computer systems are located in different data centers.

According to one aspect, a method for processing database requests is provided. The method comprises out of receiving, by a load sharing entity, a plurality of database requests from one or more client systems; storing, in a common storage location, the received plurality of database requests; assigning at least one virtual computer system to process at least one of the plurality of database requests stored in the common storage location; and providing a response to the one or more client systems that generated the at least one of the plurality of database requests. In one embodiment, the at least one of the plurality of database requests includes at least one of a group comprises a REST service request; and a SOAP service request. In one embodiment, the database requests include at least one of a group of requests comprises a POST request; a GET request; a PUT request; and a DELETE request. In one embodiment, the method further comprises an act of accessing the database in a read-only mode wherein the GET request is accessed using HTTP without a username/password information. In one embodiment, the method further comprises an act of accessing the database responsive to receiving database requests using HTTPS and SSL/TLS.

In one embodiment, the method further comprises an act of operating the server configured to receive and process database requests in at least one of a group of operating modes, the group comprises an active/single mode; an active/standby mode; and an active/active mode. In one embodiment, the method further comprises an act of operating the server to receive and process database requests, the server being operable in at least one of a group of operating modes, the group comprises a basic mode; and a query mode. In one embodiment, in the basic mode, access to a row of information in the database is performed using a full key value.

In one embodiment, in the basic mode, browsing a table sequentially using a full or generic key value. In one embodiment, the database request includes a request type identifier. In one embodiment, the request type identifier includes at least one of a group of request type identifiers, the group comprises an indicator that specifies that the database request includes a precise key; and an indicator that specifies that the database request includes a generic key. In one embodiment, the indicator that specifies that the database request includes the generic key indicates that database records retrieved from the database are to retrieved responsive to at least one of a group of a plurality of operators specified in the database request, the group of operators comprises a greater than or equal to relationship operator; a greater than relationship operator; a less than or equal to relationship operator; and a less than relationship operator. In one embodiment, the method further comprises an act of returning a key of an actual record responsive to the full or generic key value.

In one embodiment, the method further comprises an act of returning the key of the actual record within an HTTP status text field. In one embodiment, the method further comprises an act of setting record retention at a row level. In one embodiment, the method further comprises an act of including a time to live value within the database request. In one embodiment, the method further comprises an act of returning a set of database fields from the database responsive to a view indicator defining the set of database fields. In one embodiment, the view information is specified within at least one of the plurality of received database requests. In one embodiment, the method further comprises an act of setting record retention at a row level of the database. In one embodiment, record retention information is specified within at least one of the plurality of received database requests. In one embodiment, the method further comprises an act of setting security at a field level of the database.

In one embodiment, the database includes a data structure specifying one or more users having field level access to information stored in the database. In one embodiment, the database is adapted to control access to the database responsive to the received database requests at a field level of the database based on one or more user identifiers. In one embodiment, the method further comprises an act of performing a query of the database in an offload processing mode responsive to an indicator defining the offload processing mode. In one embodiment, the method further comprises an act of responding to a database request that does not specify a table name. In one embodiment, the method further comprises an act of responding to a database request that joins information from a specified table.

In one embodiment, the method further comprises an act of responding to a trigger event that defines a database operation. In one embodiment, the method further comprises an act of performing, responsive to the trigger event, at least one of a group comprising a synchronization of data with another database service, a logging of data to a logging service, a receipt of information to the database, and a publication of data to an external destination. In one embodiment, the trigger event may be specified as a synchronous or an asynchronous operation. In one embodiment, the method further comprises an act of setting record retention responsive to received record retention information within at least one of the plurality of received database requests. In one embodiment, the database is a NoSQL key/value store database. In one embodiment, the method further comprises an act of distributing the plurality of database requests among a group of virtual computer systems.

In one embodiment, the group of virtual computer systems are located within a partition. In one embodiment, the method further comprises an act of assigning a database application to the partition. In one embodiment, the method further comprises an act of sharing, by the group of virtual computer systems, the common storage location that stores the plurality of database requests.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
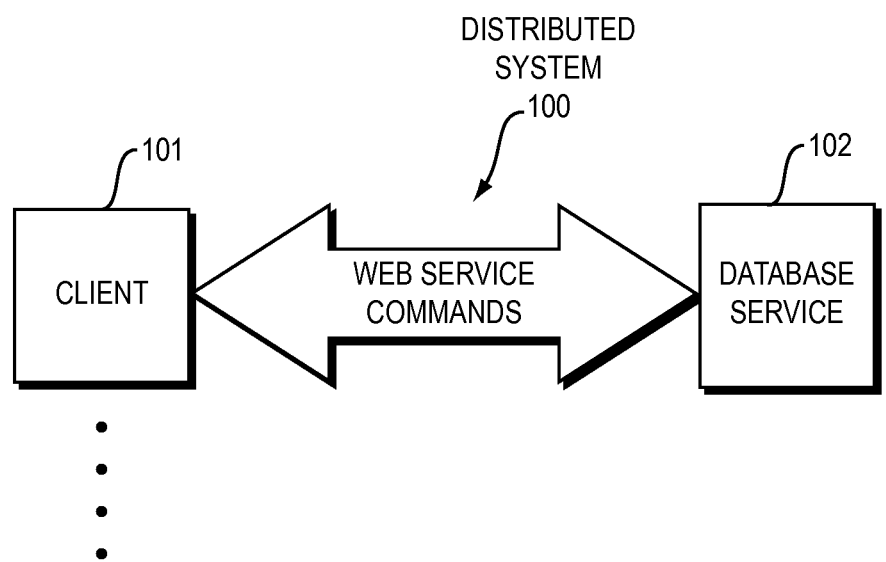
FIG. 1 is a block diagram showing a system for database web service commands according to various aspects of the present invention.

FIG. 1 shows a block diagram of a distributed system 100 suitable for implementing various aspects of the present invention. In particular, according to one embodiment, FIG. 1 shows a system 100 that includes a database service 102 that is capable of storing and servicing web service commands according to various embodiments of the present invention. More particularly, a database service 102 may be provided that services one more web service commands received from one more clients (e.g., clients 101A-101C). Such web service commands may be serviced as part of a website, application service, storage or other web service type. It may be beneficial to provide a database storage and command processing platform that is robust and capable of being scaled to any type of application.

Figure 2A:
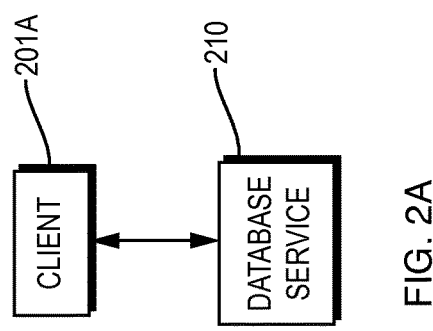
FIGS. 2A-2C show embodiments of various database modes according to various embodiments of the present invention.
Figure 2B:
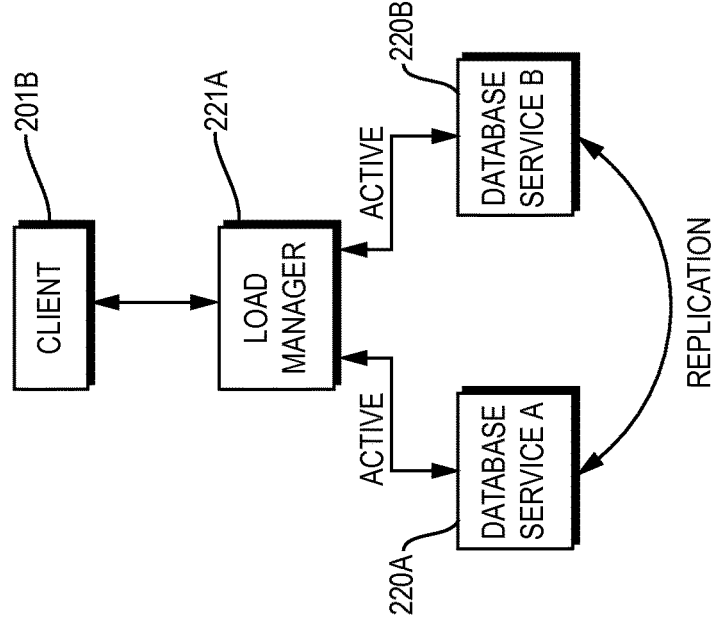
Figure 2C:
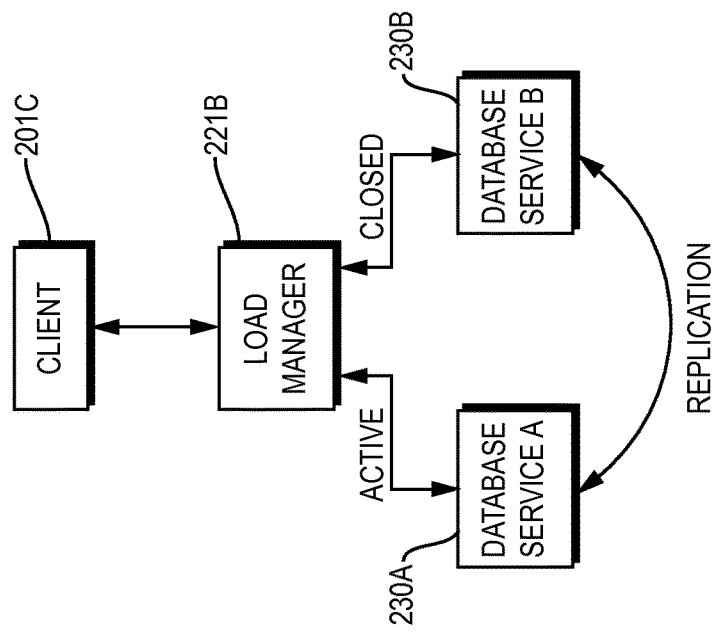

FIGS. 2A-2C show various embodiments of different database service modes according to embodiments of the present invention. For example, FIG. 2A shows an active single mode where a single instance of the database service (e.g., database service 210) provides support and servicing of client requests (e.g. from client 201A). In what is referred to herein as an active/active configuration, a client (e.g., client 201B) sends a request to a load manager 221A that distributes requests to two or more database services (e.g. database service 220A, database service 220B). In this configuration, the load manager sends requests to multiple services, and replication ensures that each database service is consistent. FIG. 2C shows an active/standby configuration where one database service (e.g., database service A 230A) receives and processes requests through an active port, and where one or more other database services (e.g., database service B 230B) remains "closed" and does not receive and process requests directly.

According to one embodiment of the present invention, it is appreciated that a database service may be configured using a virtualized environment with logical storage shared between virtual servers, and the database service may direct web service requests including database requests to an available virtual server suitable for servicing the request. For instance, the database service may direct the request to the most underutilized virtual server that is available. In another embodiment, requests may be stored in a common location accessible by multiple virtual servers, and therefore, replication of request data is not necessary between servers that share the common storage location. Further, upon failure of a particular server, another server may be tasked to service the request, accessing the request in common storage.

Figure 3:
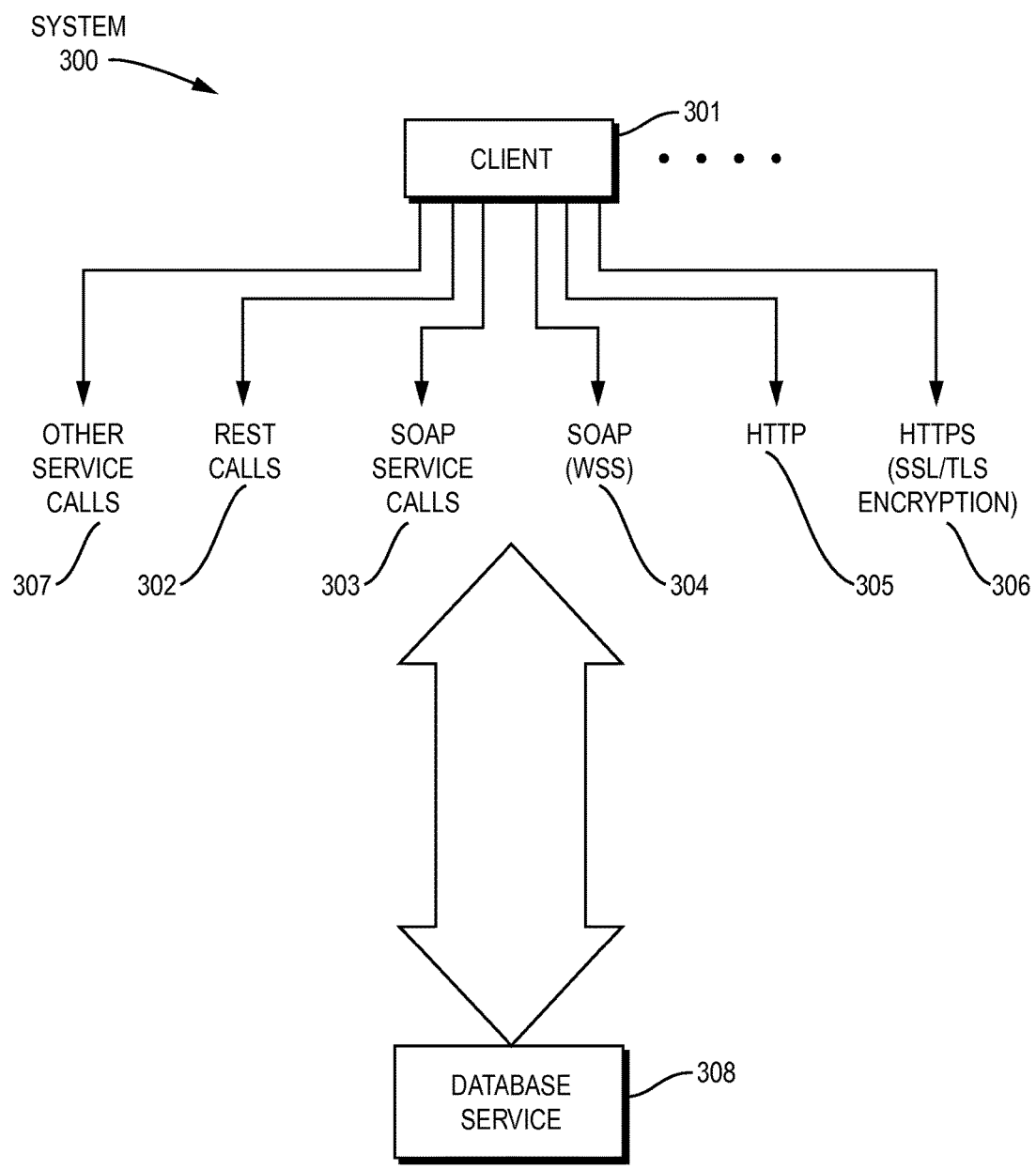
FIG. 3 shows a diagram of different web service requests that may be serviced according to various embodiments of the present invention.

FIG. 3 shows a diagram of different web service requests that may be serviced according to various embodiments of the present invention. For instance, a distributed system 300 may be used that includes a client 301 that initiates one or more web service requests that are serviced by a database service (e.g., database service 308). The service requests may include, but are not limited to, HTTPS (e.g., with SSL/TLS encryption) 306, HTTP requests 305, secure SOAP (e.g., using WS-Security or WSS) 304, SOAP service calls 303, REST calls 302, or other types of service requests 307. It should be appreciated that any type of request or message format may be used with various aspects of the present invention.

Figure 4:
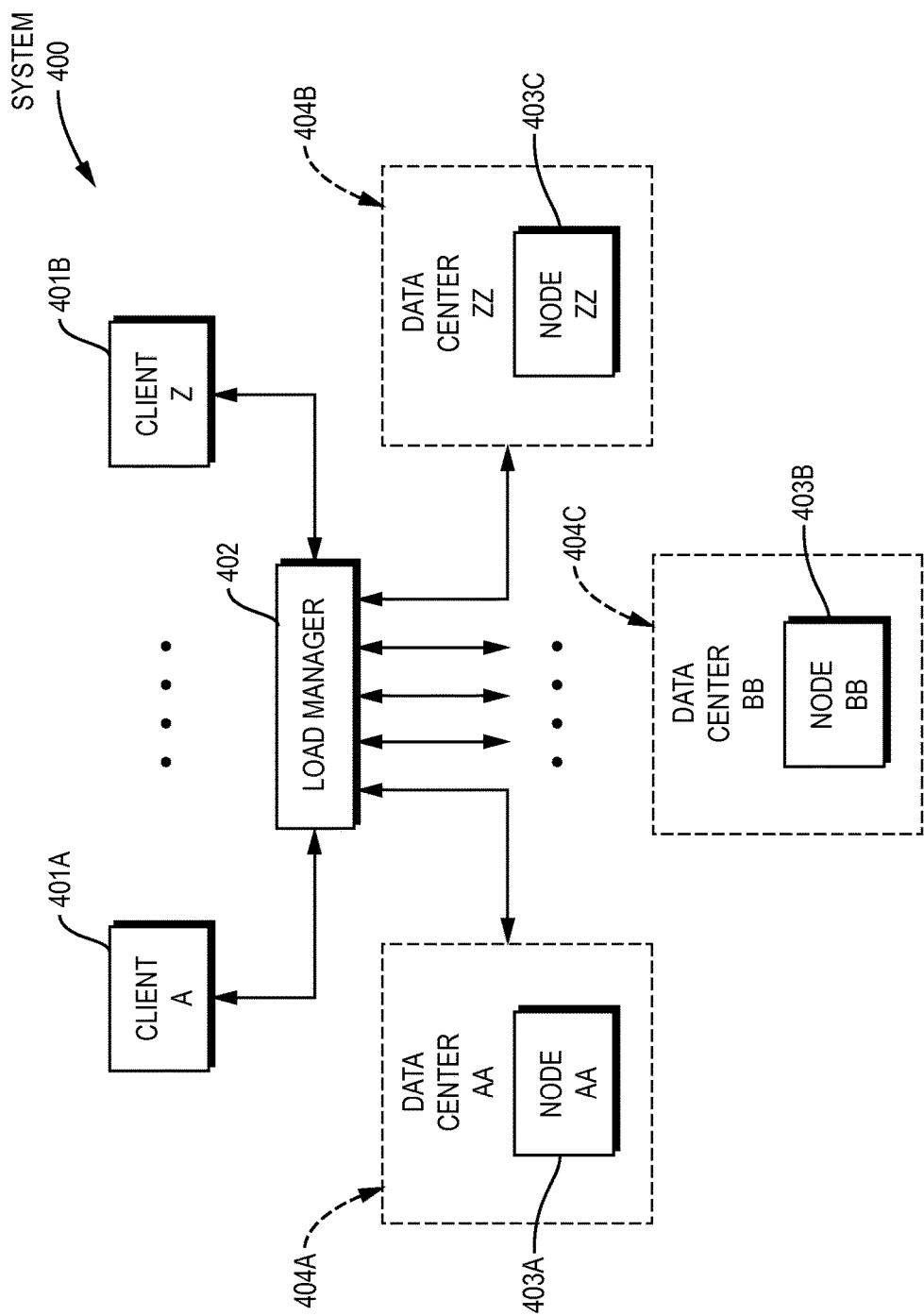
FIG. 4 shows an example configuration of a database service according to one embodiment of the present invention.

FIG. 4 shows an example configuration of a database service according to one embodiment of the present invention. It is appreciated that a database service may be operated among multiple data centers in a distributed computer system 400 according to one embodiment of the present invention. For instance, requests received by clients (e.g., client A 401A, client Z 401B, etc.) may be directed to different data centers (e.g., data center AA 404A, data center ZZ 404B, data center BB 404C) by a load manager (e.g., load manager 402). Load manager 402 may be a router, a computer system or other type of specialized system capable of receiving requests and directing the requests to different data centers. Each data center may include one or more nodes or systems capable of servicing such requests. Such nodes may include, for example, node AA 403A, node BB 403B, node ZZ 403C. It is appreciated that such nodes may include physical systems, such as one or more server systems, a collection of systems (e.g., bladed server systems), a cluster of systems, mainframe computer system, or any type and configuration of systems. Such systems may also include virtualized resources such as virtual server systems, and may include one or more levels of virtualization. In one embodiment, such a database system may be implemented across data centers to provide redundancy in the case of site or system failure.

Figure 5A:
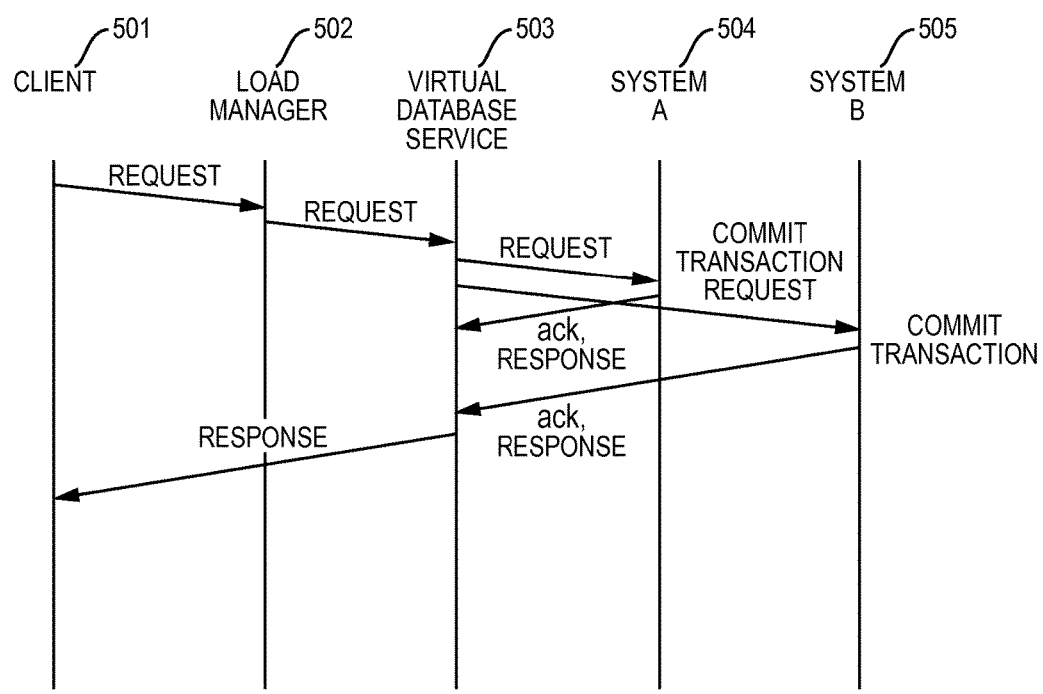
FIGS. 5A-5B show example processes performed by a database service according to one embodiment of the present invention.
Figure 5B:
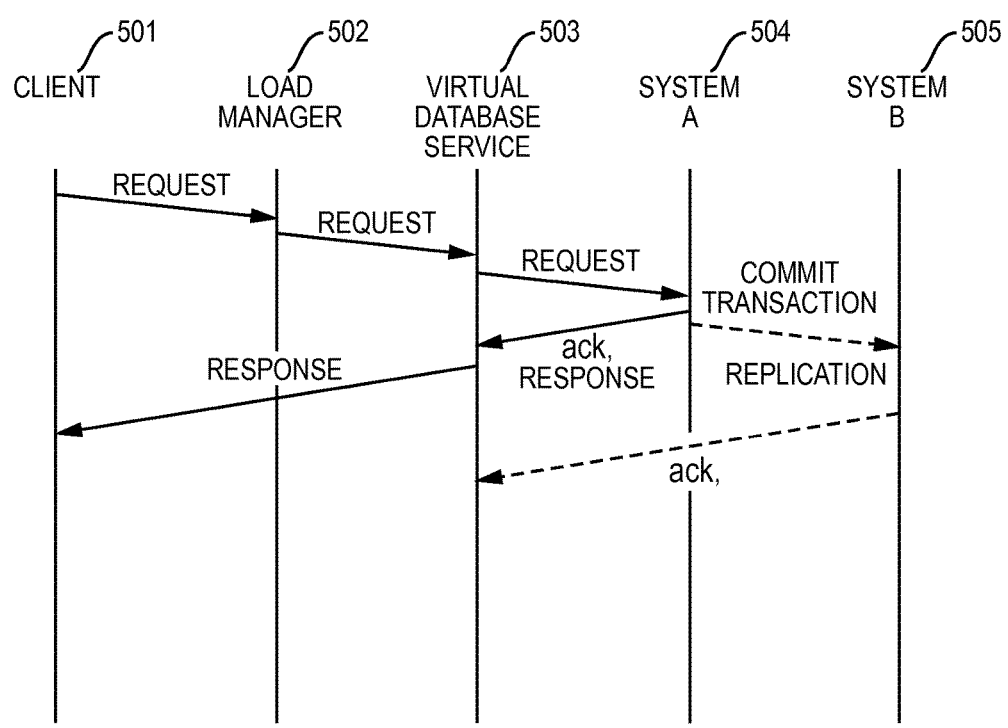

FIGS. 5A-5B show example processes performed by a database service according to one embodiment of the present invention. In particular, FIG. 5A shows an active/active configuration where requests are sent to a number of systems simultaneously. In the event of failure, one of the active database systems continues to operate.

In the example shown, a client (e.g., client 501) sends a request to a load manager (e.g., load manager 502) which directs the request to a database service. According to one embodiment, the database service may be a virtual database service implemented on a virtual computer system. For instance, the virtual computer system may include one or more virtual servers that receive database requests and direct them to one or more systems to be processed. For instance, virtual database service 503 main direct a request in an active/active configuration to both a system A 504 and a system B 505 for processing. In an active/active configuration, both system A and system B receive and process the request and provide an acknowledgment and response to the virtual database service 503. The virtual database service 503 provides a response directly to client 501.

FIG. 5B shows an active/standby configuration where two or more database service entities receive one of the web service requests, but a single entity is responsible for committing transactions. The client 501, load manager 502, virtual database service 503, and systems (e.g., systems 504, 505) may be configured to operate in active/standby or active/active mode as discussed above. According to one embodiment, the virtual database service 503 directs a request to one of the systems (e.g., system 504) responsible for committing the transaction, and the responsible system replicates any necessary data to the other system (e.g., system 505). Virtual database service 503 is configured to respond to client 501 once a response is received from the responsible system (e.g., system 504). As the standby system (e.g., system 505) does not receive the request directly, the standby system takes over only upon failure of the primary system (e.g., system A).

Figure 6:
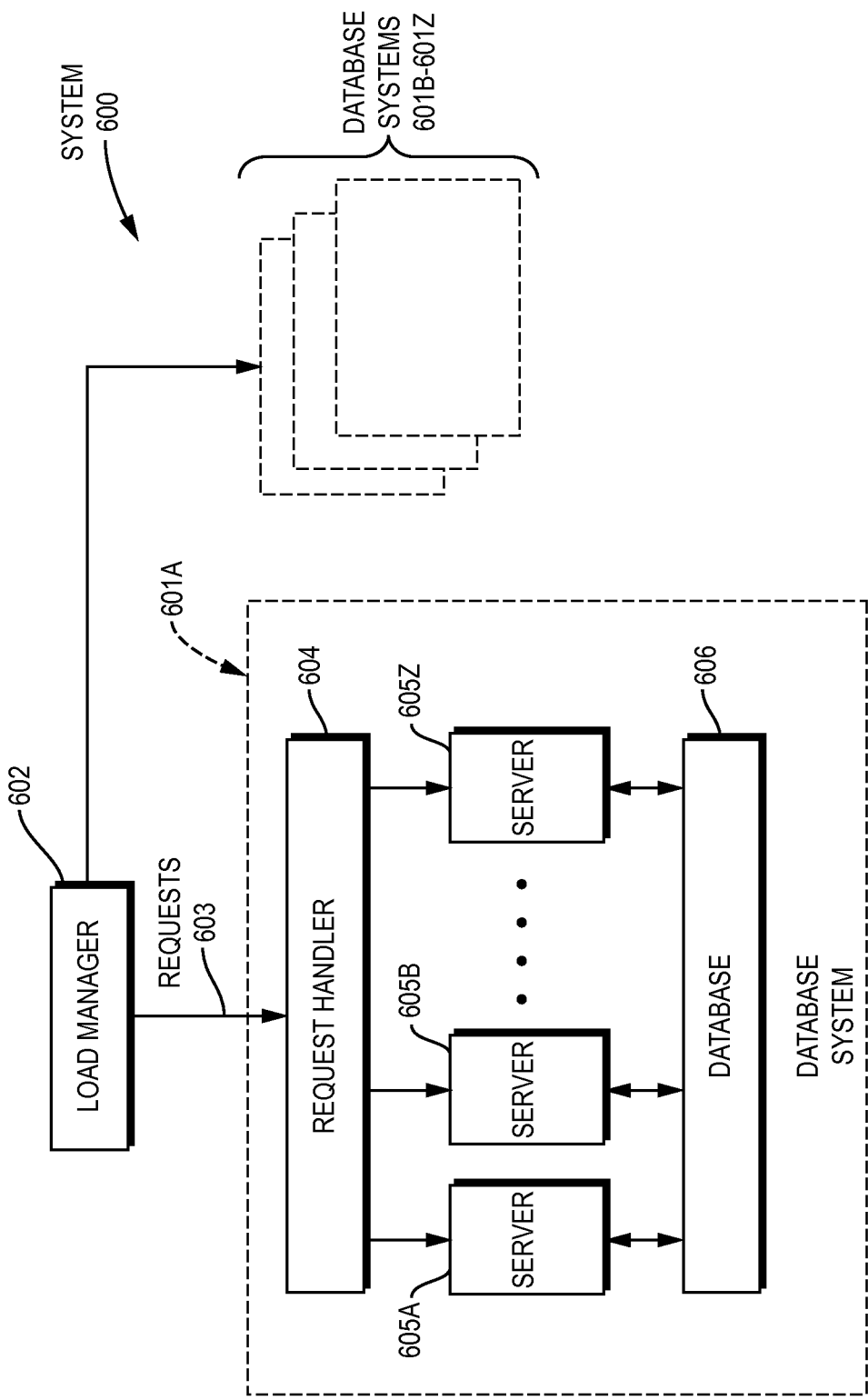
FIG. 6 shows an example computer system with which various aspects of the invention may be practiced.

FIG. 6 shows an example computer system with which various aspects of the invention may be practiced. For example, a distributed system 600 may be provided that caches web service requests according to various embodiments of the present invention. System 600 includes one or more database systems (e.g., 601A-601Z) that operate to receive and process requests. System 600 may also include a load manager 602 that directs received requests (e.g., requests 603) to one or more database systems for processing. Each database system may also include a request handler 604 that determines, within the database system, what systems will be processing each request. In one example implementation, a number of servers (e.g., servers 605S-605Z) are configured to receive requests directed to them from the request handler 604. Each of the servers may be provided access to a logical storage system 606 where transactions may be committed. Further, requests that are received by the request handler 604 may be stored within a common area whereby servers may access and process received database requests. If a failure occurs, and the request is not processed, another server may be capable of servicing the request. The distributed system may use a common outward-facing URI for receiving requests from one or more entities (e.g., client systems).

Figure 7:
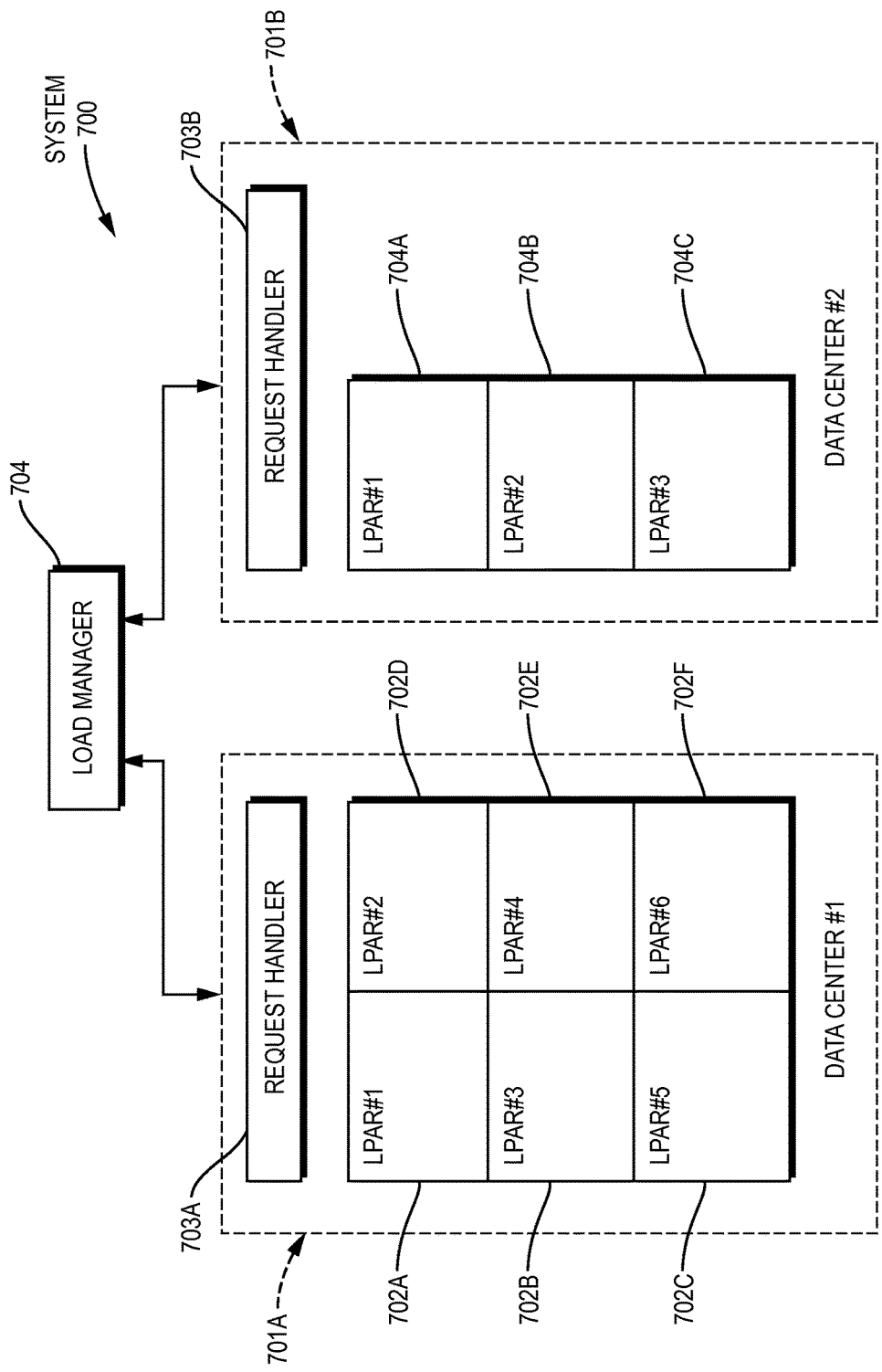
FIG. 7 shows one example implementation of a database service using logical partitions distributed among multiple data centers according to one embodiment of the present invention.

FIG. 7 shows one example implementation of a database service using logical partitions distributed among multiple data centers according to one embodiment of the present invention. In particular, it should be appreciated that a database server may be implemented within a system having logical partitions. A logical partition (LPAR) is the division of a computer processor, memory, and storage into multiple sets of resources so that each set of resources can be operated independently with its own operating system instance and applications. A logical partition may be defined that exists on a single computer system or group of computer systems. For example, many systems, including but not limited to standalone computer systems, groups of computers, clusters, mainframes, and other types of systems may use logical partitions.

As shown in FIG. 7, a distributed system 700 may be provided that includes a number of data centers each having one or more request handlers and logical partitions. For instance, the database service in a data center #1 (item 701A) may include a request handler (TCP/SD) 703A similar to request handler 604 of FIG. 6. Further, a data center #2 may include a similar request handler (TCP/SD) 703B. Such handlers may receive requests and allocate them to processing entities to be serviced.

As discussed, a database service may include one or more servers or other processing entities that are capable of processing requests. For instance, as discussed, such entities may include logical partitions or LPARs. In the example shown, the data center #1 may include a number of LPARs (e.g., LPAR#1-LPAR#6 (items 702A-702F)) that are adapted to receive and process requests from request handler 703A. Further, in the example shown, a data center #2 may include a number of LPARs (e.g., LPAR#1-LPAR#3 (items 704A-704C)) that are adapted to receive and process requests from request handler 703B. According to one embodiment, users, organizations, applications or other entities may be assigned to a particular database service, and that database service may have an assignment of particular resources (e.g., LPARs, storage, etc.) to fulfill the service requirements for web requests including database requests associated with the database service. Such resources may be allocated to particular entities using, for example, a management interface that is used to set up the database service for a particular entity.

Figure 8:
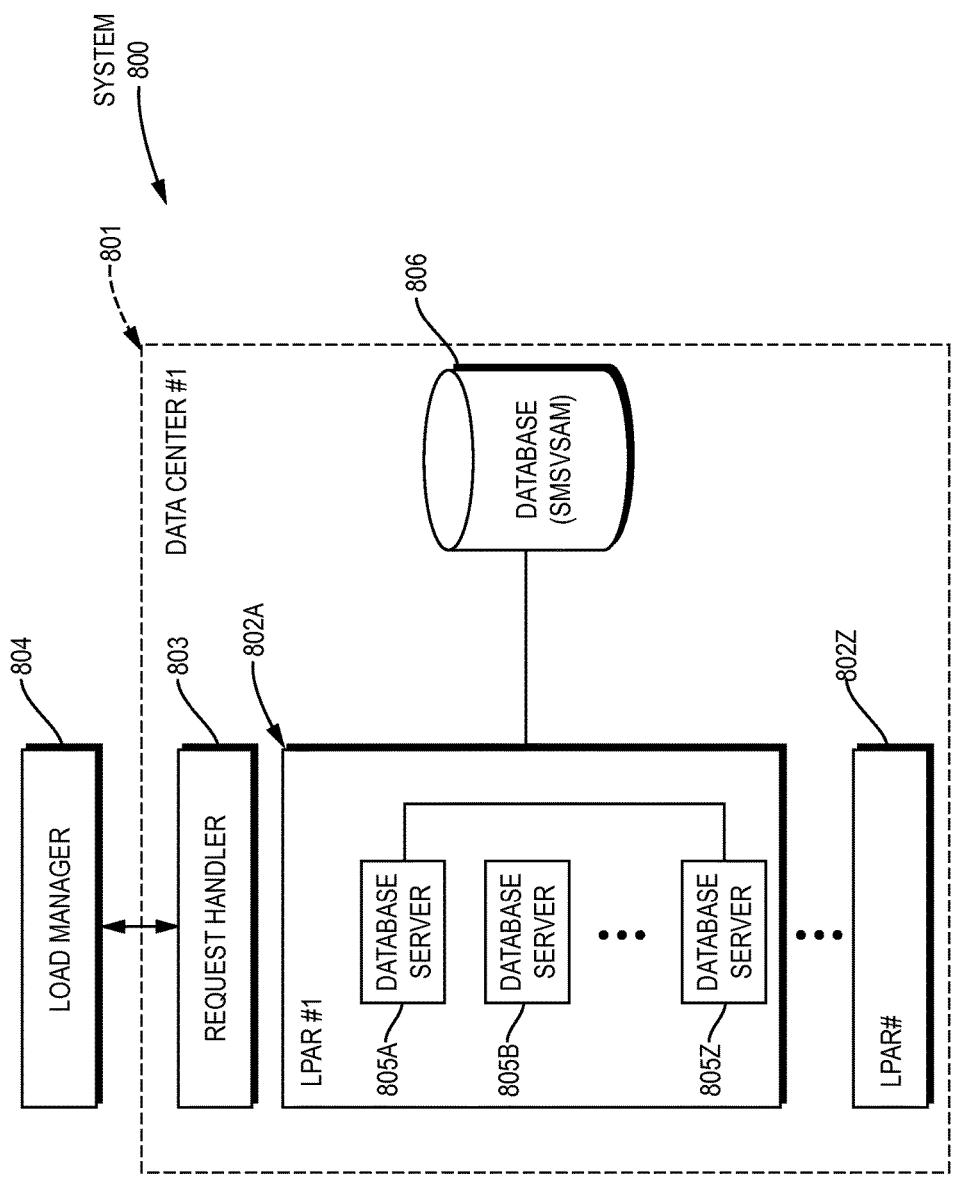
FIG. 8 shows a more detailed implementation of a database service that utilizes multiple database servers within a logical partition according to one embodiment of the present invention.

FIG. 8 shows a more detailed implementation of the database service that utilizes multiple database services within a logical partition according to one embodiment of the present invention. For instance, a distributed system 800 is shown including a data center #1 and a defined database service. System 800 includes a load manager 804 that performs similar functions as discussed above. The database service also includes a request handler 803 that receives database service requests.

In one implementation, within a particular LPAR (e.g., LPAR #1 (item 802A)), one or more database servers (e.g., database servers 805A-805Z) may be defined that are capable of servicing database service requests. Such servers may include, for example, one or more virtual servers that are defined within the particular LPAR. Other LPARs (e.g., LPAR 802Z) may also have database server processes defined within these other LPARs. According to one embodiment, multiple database server processes are permitted to access a logical storage entity for the purpose of servicing database requests. Logical storage may include, for example, one or more physical storage devices, servers, or other entities capable of storing data. For instance, a logical storage entity 806 may be commonly accessed by multiple database servers. The database servers may share the same logical address space with other servers, and therefore may be capable of servicing requests associated with a particular defined database service.

In one implementation, the database service may be implemented in an IBM mainframe environment. For instance, the database service may be implemented using LPARs as defined in the IBM z/OS environment, as known in the art. Multiple LPARs running z/OS can form a sysplex or parallel sysplex, whether on one machine or spread across multiple machines. Further, such systems may use a logical storage entity such as a VSAM (virtual storage access method) as is used with the z/OS, wherein an enterprise can organize records in a file in physical sequence (the sequential order that they were entered), logical sequence using a key (for example, the employee ID number), or by the relative record number on direct access storage devices (DASD). Although some examples are shown using an IBM mainframe environment, it should be appreciated that other virtualized computer system types having common storage capabilities may be used, and aspects of the present invention may be used other similarly-configured systems.

Figure 9:
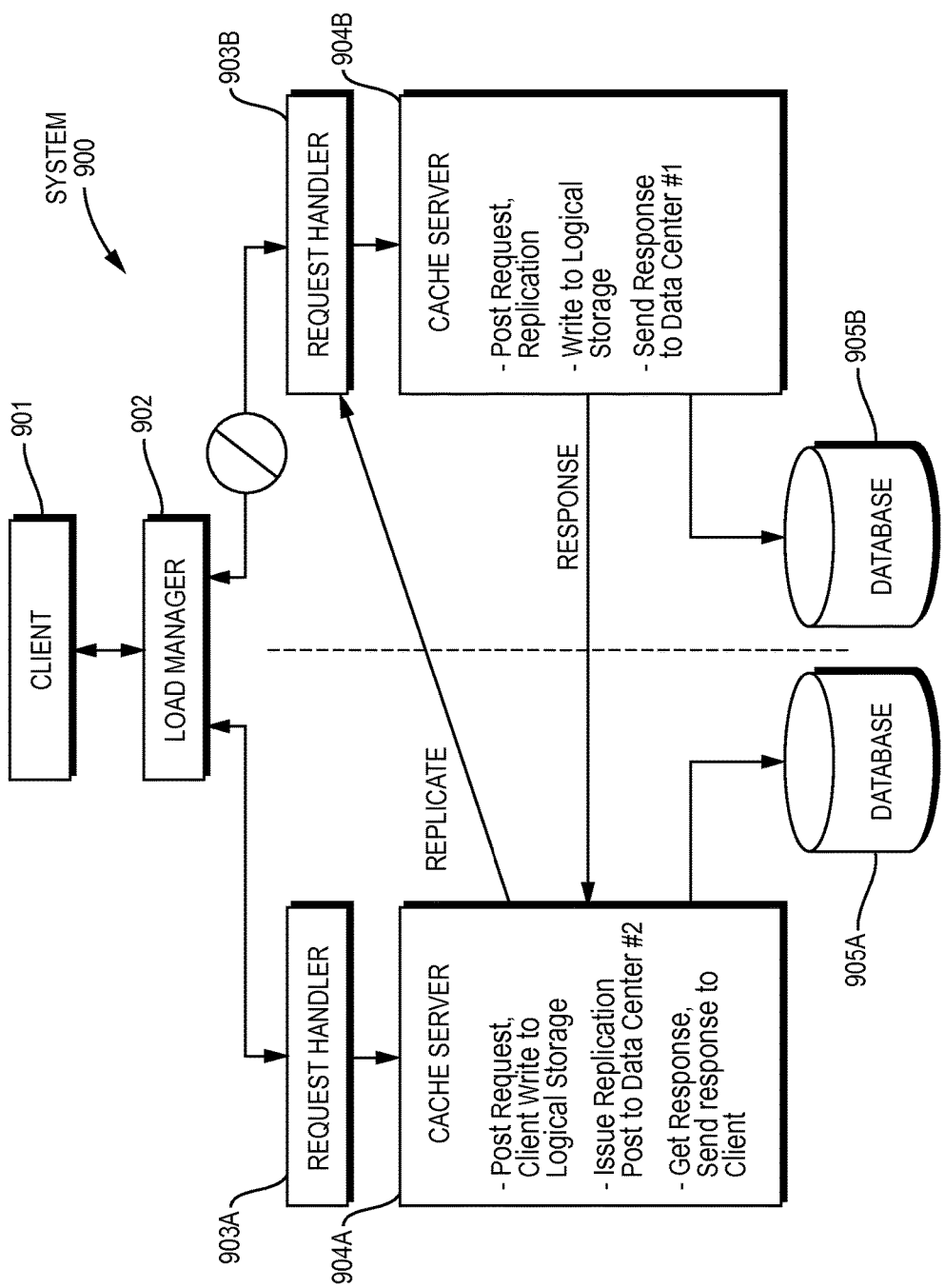
FIG. 9 shows a process of database service requests and storing requests in logical storage according to one embodiment of the present invention.

FIG. 9 shows an example process of database service requests and storing requests in logical storage according to one embodiment of the present invention. In a distributed computer system 900, a client 901 communicates a request to a load manager 902. The load manager sends the request to a request handler 903A. In the case of FIG. 9, the database service is configured in an active/standby mode, where the request is not forwarded to the other request handler of the cache server (e.g., request handler 903B associated with cache server 904B).

In the example shown in FIG. 9, cache server 904A receives the request, performs a post operation on the request which results with a right to logical storage. In the active/standby mode, the first database server issues a replication post to the request handler of the database system of data center #2. Request handler 903B sends the request to a suitable database server (e.g., database server 904B) which hosts the requests and rights to logical storage (e.g., logical storage 905B). The standby database server sends a response to the active database server of data center #1. The active database server receives the response and sends the response to the client. In this way, the standby and active servers in both data centers are updated, and upon failure of the active server, the standby server may begin servicing requests (e.g., when the load manager 902 forwards requests to a port of the standby server).

In a more detailed example, there are three configurations available to each partition or user of the database service:
   active/single
   active/standby
   active/active In one embodiment, the configuration is set for each partition/user by using a parameter file that specifies the mode of operation. In one embodiment, each active/single data center has its own URL/port combination, and clients are configured to referencing the URL/port directly in their database requests. In an active/standby configuration, the database system may have a URL/port managed by a monitoring component (e.g., a load manager or other entity), and client requests reference the monitoring component (e.g., load manager, load balancer, router or other entity). In the active/standby configuration, a client does not reference the active/standby URL/port directly, as only the monitoring component (e.g., a network router and load balancer) references the active/standby URL/port.

In one implementation, in the active/active has a URL/port managed by the database server monitor, with client requests referencing a network router and load balancer. A client does not reference the active/active URL/port directly, as only the network router and load balancer references the active/active URL/port.

When in an active/single configuration, a database server partition/user is defined to one data center within a virtual computing system. For instance, a z/OS Parallel Sysplex may be used, and as is known, the z/OS Parallel Sysplex combines two basic capabilities of parallel processing and enabling read/write data sharing across multiple systems with full data integrity. A z/OS Parallel Sysplex configuration may include two or more physical zEnterprise servers (CPC/CEC (where CPC is a central processor complex, and CEC is a central electronic complex or mainframe "box")), two or more logical partitioned operating systems (LPAR) and two or more virtual transaction servers (e.g., implemented as virtual servers, also commonly referred to as "regions"). One virtual transaction server that may be used in the IBM mainframe environment includes the well-known CICS server. The CICS (Customer Information Control System) servers is a well-known family of application servers and connectors provided by IBM that provides industrial-strength, online transaction management and connectivity for mission-critical applications.

In one example implementation, a client application that uses a database service according to various embodiments sends a REST/SOAP web service request to one URL for an active/single port for a specific data center and the request handler (e.g., a z/OS TCP/SD (Sysplex Distributor) and WLM (work load manager)) routes the request to the 'best performing' LPAR and CICS server. Because the request database (e.g., a cache file stored by SMSVSAM and/or CFDT) are accessible to all CICS servers and z/OS LPARs, there is no replication necessary between LPARs and/or CICS regions. With the z/OS Parallel Sysplex, TCP/SD, WLM, multiple LPAR and CICS servers, the active/single provides high availability (HA) and load balancing. Should the entire z/OS Parallel Sysplex fail, there is no recovery or replication required when the system is restarted.

When in an active/standby configuration, a database server partition/user is defined to one data center within a z/OS Parallel Sysplex as 'active' and another data center within a z/OS Parallel Sysplex as 'standby'. Both active and standby systems are "live" and include two or more zEnterprise servers (CPC/CEC), two or more logical partitioned operating systems (LPAR) and two or more CICS servers (e.g., virtual servers). The client application that uses the database service sends a REST/SOAP request to one URL, which is handled by a network router and load balancer, which then routes the request to the active/standby port on both data centers.

The active system maintains the client port opened, allowing requests from the network router and load balancer. However, the standby system maintains the client port closed. The closed port signals the network router and load balancer to send requests to the active system, which maintains the open client port. The client port on both the active and standby systems are monitored and managed by a database server background process.

According to one embodiment, while requests are being processed by the active system, asynchronous replication is performed on the request through an internal port only known by database server to the standby system. The internal port, used by both active/standby and active/active is only known to database server systems and does not process any requests from database server clients and/or network router and network load balancers. With the z/OS Parallel Sysplex, TCP/SD, WLM, multiple LPAR and CICS servers, the active/standby provides high availability (HA) and load balancing within the active Sysplex. Should the entire Active z/OS Parallel Sysplex fail, the database server monitor (background process) on the standby system detects the situation, then immediately opens the client port and sets the database server monitor control file as 'in recovery' status for the system and for each partition/user.

When the client port is available, the network router and load balancer then begins routing all active/standby requests to the new 'active' system, which previously was marked/designated as 'standby'. Because database server requests were being replicated from the other system before the failure, the cached information is readily available when the client port becomes active, except for messages that were between client response and asynchronous replication. For those records in this situation, the next GET request returns a 'not found' status, prompting the client to issue another POST to create the record in the new Active system.

When the failed z/OS Parallel Sysplex, LPARs and the CICS servers are restarted, the active/standby client port is defined as 'closed', preventing the network router and load balancer from sending database server requests to the new 'Standby' system, however the internal port known only to database server is defined as 'open'. On the active system, a database server monitor (e.g., a background process) detects that the database server CICS servers are now available through the internal port, which initiates a background process on the active system side that begins the recovery process. Each database server partition/user includes a 'recovery' task started by the database server monitor which reads through the database server file system and issues a POST request across the internal port to the standby system. When each recovery task completes, a status record for each database server partition/user is updated in the database server master control file, which is used by the database server monitor process. During this recovery process, client requests are being processed on the active system, with asynchronous replication being performed on the request through the internal port to the Standby system. Both recovery and replication requests are processed concurrently across the internal port between the active and standby systems. When the recovery task(s) are complete, replication continues for client requests received through the client port on the active system, and the database server monitor control file is set as 'recovery complete' for the system and for each partition/user. The client port on the newly recovered 'active' system is opened and the client port on the 'standby' system is closed, shifting the workload back to the primary active/standby configuration for those partitions/users within the two data center clusters.

When in the active/active configuration, a partition/user that uses the database service is defined to two data centers, providing a z/OS Parallel Sysplex each defined as 'active'. Both active systems are "live" and include two or more zEnterprise servers (CPC/CEC), two or more logical partitioned operation systems (LPAR) and two or more CICS servers (e.g., implemented as virtual servers).

According to one implementation, a client application that uses the database service sends a REST/SOAP request to one URL, which is handled by a network router and load balancer, which then routes the request to the active/active port on both data centers. The client port on both active/active systems is opened allowing the network router and load balancer to send requests to both active/active systems. While requests are being processed by the active system that receives the request, synchronous replication is being performed on the request through an internal port only known by database server. The internal port, used by both active/standby and active/active is only known to database server systems and does not process any requests from database server clients and/or network router and network load balancers. With the z/OS Parallel Sysplex, TCP/SD, WLM, multiple LPAR and CICS servers, the active/active provides high availability (HA) and load balancing within the active Sysplex. Should an entire active z/OS Parallel Sysplex fail, the database server monitor (background process) on the other active system detects the situation, and sets the database server monitor control file as 'in recovery' status for the system and for each partition/user. When the failed z/OS Parallel Sysplex, LPARs and CICS servers are restarted, the active/active client port is defined as 'closed', preventing the network router and load balancer from sending database server requests and the database server monitor control file is set as 'in recovery' status for the system and for each partition/user. The internal port on the recovering system is open during restart. On the opposite active system, a database server monitor (background process) detects the database server CICS servers are now available through the internal port, which initiates a background process on the active side that begins the recovery process.

Each database server partition/user includes a 'recovery' task started by the database server monitor which reads through the database server file system and issues a POST request across the internal port to the recovering active system. When each recovery task completes, a status record for each database server partition/user is updated in the database server master control file on both systems, which is used by a monitor process of the database server. During this recovery process, client requests are processed on the active system, with synchronous replication being performed on the request through the internal port to the recovering active system. Both recovery and replication requests are processed concurrently across the internal port between the active and recovering systems. When the recovery task(s) are complete, the port on the recovering system is set to 'opened', enabling the network router and load balancer to send requests to both active/active systems. The database server monitor control file is set as 'recovery complete' for the system and for each partition/user on both active/active systems.

According to one embodiment, new commands may be provided that implement various basic functions (e.g., POST, GET, PUT and DELETE commands) in a database system according to various embodiments of the present invention. For example, one process that may be defined according to various embodiments, is a key delete process. For instance, when a DELETE request from the client specifies a key in the URI, a specific record from the database server is deleted with the request replicated to the opposite (remote) data center. For instance, in a large database, a user may desire to delete a large number of product entries in the database, and thus, by specifying a key range, a single DELETE operation may be performed (e.g., by matching a pattern).

Another option that may be supported by the DELETE request may include a list of keys to be deleted using a 'regex' or regular expression verb on the URI. On a DELETE request with &regex specified on the URI, database server will delete a list of keys that match the pattern specified in the &regex command. Patterns for &regex may be specified as follows:

| | |
|---|---|
| /key®ex=* | Delete all keys |
| /key®ex=Sam* | Delete keys that start with Sam (inclusive of a key 'Sam') |
| /key®ex=Sam*1 | Delete keys that start with Sam and ending with '1' |
| /key®ex=*Sam* | Delete keys that contain the word Sam |

According to one embodiment, during the delete process, only records with a time stamp of equal or older than 'current' time are deleted. This feature allows records to be added/updated (POST/PUT) during a delete process when &regex has been specified.

Another feature that may be provided with the delete request when &regex has been specified includes a 'synchronous delete request' (SDR) or an 'asynchronous delete request' (ADR). The .SDR or .ADR may be specified in the final qualifier of the URI that precedes the key portion of the URI. When .SDR is requested, the delete process is performed synchronously, then the response is returned to the client. When .ADR is requested, the delete process is performed asynchronously after the response has been returned to the client.

In another example, another process that may be defined according to various embodiments, is a key retrieval process or GET. When a GET request from the client specifies a key in the URI, a specific record from database server is returned. Another option associated with the GET request includes a list of keys to be returned (instead of actual record data) using a 'regex' or regular expression verb on the URI. On a GET request with &regex specified on the URI, database server may be adapted to return a list of keys that match the pattern specified in the &regex command. Patterns for &regex may be as follows:

| | |
|---|---|
| /key®ex=* | Return all keys |
| /key®ex=Sam* | Return keys that start with Sam (inclusive of a key 'Sam') |
| /key®ex=Sam*1 | Return keys that start with Sam and ending with '1' |
| /key®ex=*Sam* | Return keys that contain the word Sam |

It should be appreciated that other commands or operations may be provided when in a particular database mode of operation.

In yet another embodiment, a distributed method for updating timestamp information related to stored data is provided. Such timestamp distribution may be used in association with the database service for web service requests as discussed above. For instance, it is appreciated that timestamp information for data may need to be made consistent across multiple datasets (e.g., located at different datacenters). It is realized that in high-volume transaction systems such as a web-based transaction system, it may not be feasible to adequately transmit timestamp information in an effective manner between systems due to overhead, network traffic, performance, and other considerations. In one embodiment, the database server may execute a background process that expires According to one embodiment, a record expiration process includes an asynchronous or background process that executes on intervals (e.g., as set in a database server control file) in each of the servers defined in the active/single, active/standby and active/active systems. According to one embodiment, the server startup process starts an expiration task for each partition/user file defined in the servers with the interval defined in the database server control file. Each expiration task establishes and global ENQ or lock across the Sysplex to ensure serialization of the expiration process for each partition/user. The global ENQ or lock is released when the expiration task completes processing of the partition/user file. Database server expiration tasks may be started on both systems in the active/standby and active/active configuration.

In active/single, active/standby and active/active configurations, the timestamp on each record gets set on POST/PUT requests when 'last update time' or LUT is specified with a corresponding 'time to live' or TTL value, which may be expressed in seconds. Another option is 'last access time' or LAT where the time stamp on each record gets set on GET/POST/PUT requests with the corresponding TTL value. The minimum TTL may be, for example, 300 seconds. The maximum TTL may be, for example, 86400 seconds. A default value may be set when the TTL value is not specified. For instance, the default value when not specified may be 1800 seconds.

According to one embodiment, one advantages of a database server over other distributed database products is that records do not get replicated across nodes (e.g., CICS servers) within a cluster (e.g., a Sysplex), as the file systems are accessible to all CICS servers and LPARs within a z/OS Parallel Sysplex. In one implementation, replication of POST/PUT (add/update) requests are performed across active/standby and active/active data centers for all POST/PUT requests.

Another advantage includes, according to one embodiment, how a database server handles GET and LAT requests, as the time stamp is updated for each of these requests on the local system that receives the request. However, according to one embodiment, these requests are not replicated across data centers. It is appreciated that replicating GET/LAT information across data centers would cause excessive and unnecessary network, processor and I/O overhead.

According to one embodiment, a database server handle does not need to keep time stamps synchronized across data centers when GET/LAT is utilized. Rather, according to one embodiment, time stamp information is used for record expiration, so instead of updating the time stamp on every GET/LAT request, a database server utilizes a technique called referred to herein as a time stamp exchange during the expiration process. When an expiration task is processing a partition/user file on either the active/standby or active/active systems, each record is read sequentially and the time stamp and time to live (TTL) are used to determine if the record is to be expired. When a record is eligible to be expired on the local system, a request is sent to the opposite (remote) system to delete the expired record. If the record is not eligible to be expired on the remote system, then the time stamp is returned by the time stamp exchange process to the expiration process and the time stamp updated on the local system. If the record is eligible to be expired on the remote system, then the record is deleted on the remote system, and is then deleted on the local system.

Further, a capability may be provided that permits timestamp information to be maintained for a data element based on when the data was last accessed. For instance, most data elements only information that identified when a data element was last updated, not when it was last accessed. To this end, timestamp information may be provided that indicates when the particular data entry was last accessed.

Figure 10:
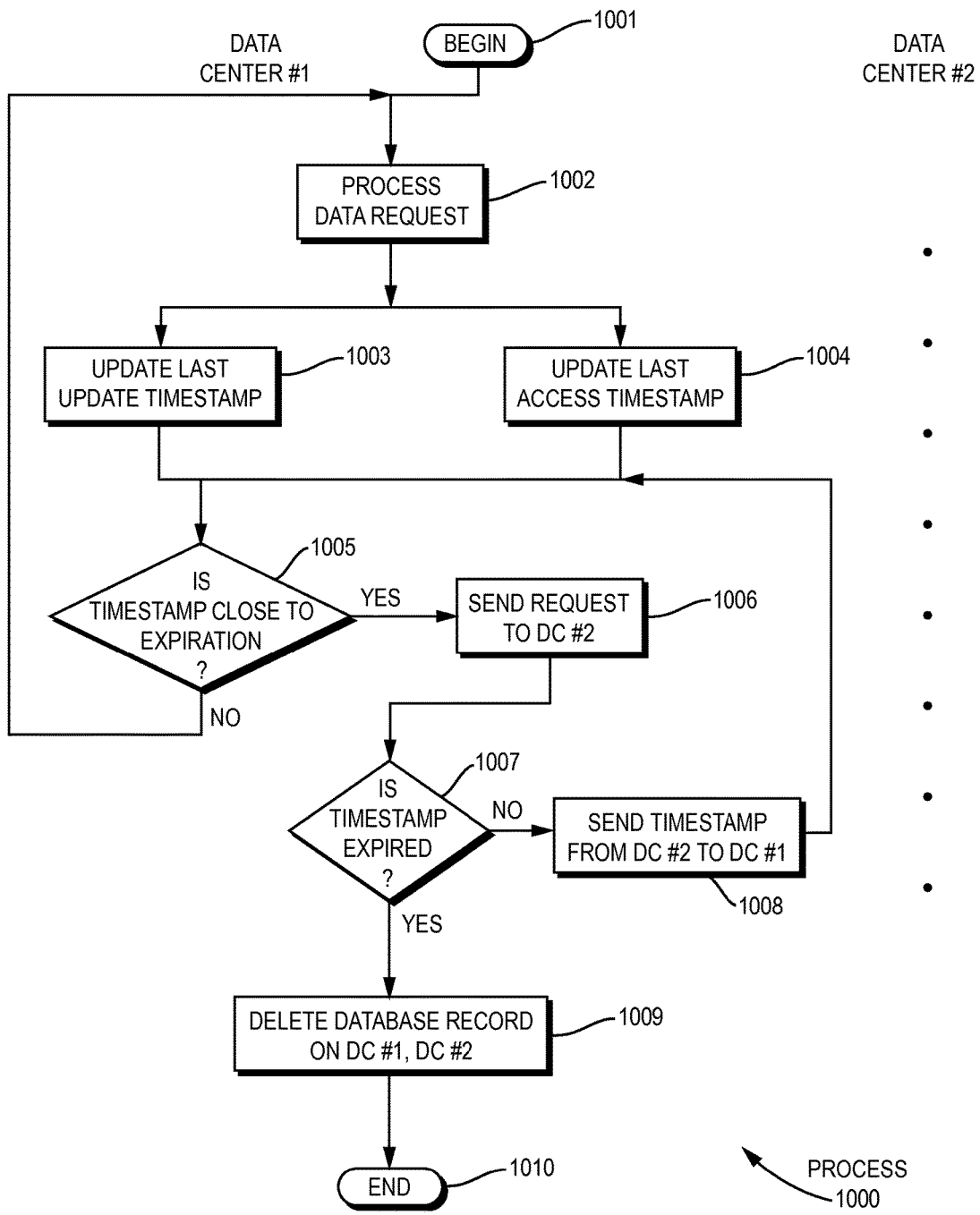
FIG. 10 shows a process for updating timestamp information according to one embodiment of the present invention.

FIG. 10 shows an example process for updating timestamp information according to one embodiment of the present invention. In particular, FIG. 10 shows a process 1000 for determining, among servers distributed among multiple data centers, when a particular database record should be deleted. A block 1001, process 1000 begins.

At block 1002, a server (e.g., a virtual server associated with a web request database service) receives and processes a data request. For instance, there may be one or more operations relate to database entries that may cause the server to update the timestamp associated with a particular database entry. For instance, at block 1003, the server may update a last update timestamp (LUT) associated with a right to a database instance. According to one embodiment, the server may also be capable of updating a timestamp based on a last access (e.g., a last access timestamp (LAT) updated at block 1004.

Further, each of the servers that may be performing operations related to the same database entries may need to determine when such entries should be deleted from the database. For instance, a block 1005, a server determines whether a timestamp associated with the database entry is close to expiration. If not, the server continues to service database requests. If the timestamp is close to expiration, the server may send a request (e.g., at block 1006) to a corresponding server from another data center (e.g., a server located at data center #2). If it is determined (e.g., at block 1007) that the timestamp associated with that database record is expired, both servers may delete the database record in the databases at both data centers (e.g., datacenters #1 and #2). If not, the datacenter may send its more recent timestamp to data center #1, and the database entry continues to exist. That is, other servers may be operating on database entries, and if another server has a more recent entry, then that database entry should not be deleted. Such timestamps may be checked periodically, eliminating the need for large numbers of messages to make data entries consistent. At block 1010, process 1000 ends.

Database Features

As discussed, various features may be provided within a NoSQL KVS database, either alone or in combination with these or other features. As discussed, some of these features include:
Two modes of operation; Basic Mode and Query Mode;
Ability to browse a table sequentially forward and backward;
Supports user defined fields in data portion of objects;
Supports user defined view of fields;
Supports multiple secondary indexes of user defined columns;
Record retention set on PUT and POST request at the row level;
Security at row, view and field levels;
Supports offload of complex queries;
SELECT options;
Table join for Insert, Update, Select and Delete requests;
Supports trigger events; and
Utilizes WS Atomic Transaction for recoverability of the ACID programming model for table join, trigger events and data replication.

Basic Mode Features

Basic Mode Security

In Basic Mode, access to each row or record of information may be achieved using a full or precise key. Each REST or SOAP POST, GET, PUT or DELETE request accesses the entire row of information. The UserID on each request is extracted thru either the HTTP or SOAP header and authenticated using the RACF (or equivalent) security manager. Each table has its own security structure where a list of UserIDs are defined with their appropriate level of security access. There are three groups of security for each UserID in Basic Mode, which are Read, Update and Delete access.

According to one implementation, all POST, GET, PUT and DELETE requests may be required to use HTTPS and SSL/TLS. The exception to this rule is for GET requests. Another feature in the security structure is a setting called 'Basic Mode Read Only', which when set to 'yes' allows GET requests for a table to be accessed thru HTTP without a UserID or Password. When this setting is set to 'no', GET requests are required to use HTTPS and SSL/TLS.

Basic Mode Browse

Also in Basic Mode, the ability is provided to browse a table sequentially forward or backward using either a full or generic key by specifying a request type in the query string. On GET requests, the query string types are:

| | | |
|---|---|---|
| ?eq | Equal (Default) | Full precise key |
| ?ge | Greater or Equal | Full or generic key |
| ?gt | Greater Than | Full or generic key |
| ?le | Less or Equal | Full or generic key |
| ?lt | Less Than | Full or generic key |

When issuing any of the browse requests, the key of the actual record retrieved is returned in the HTTP Status Text. If you want to continue the browse operation, you must move the key from the HTTP Status Text to the key on the URI Path on the next GET request. For example, an application wants to access a table with Phone Number as the key, and needs to begin with the first valid phone number in Prairie Grove, Ark. In this example, the first three phone numbers in Prairie Grove are:
The key presented in the URI would be 479-846 (generic key) with a query string of ?gt (or ?ge). The row with the first phone number matching this generic key would be returned in the message content and the full key would be returned in the HTTP Status Text, which in this example would be 479-846-0012. To continue the browse operation, the next GET request would move the full key from the HTTP Status Text to the URI, which would be 479-846-0012 and specify a query string of ?gt. The next row would be returned in the message content with the full key returned in the HTTP Status Text, which in this example would be 479-846-0018. The same logic applies for browsing backward thru a table.

Also in the query string for a browse operation, the request can specify the number of rows returned on the browse request by adding the 'max=' option. For example, a forward browse request for a generic key to return a maximum of 25 rows would be a query string of '?gt, max=25'. The default number of rows returned is one and the maximum is one hundred with a maximum message content of 3.2 mb. The key of the last row returned is provided in the HTTP Status Text, which can be used for the next browse request.

Basic Mode Data Retention

Another feature of Basic Mode is the ability to set record retention at the row level. Each POST and PUT request has the option in the query string to specify a retention period or 'time to live' (TTL). The minimum TTL is one day and the maximum is 100 years, with the default (when not specified) as seven years. To specify a TTL, the query string of ?ttl= with the numeric range specified in days. For example, a ?ttl=1 is one day, ?ttl=365 is one year and ?ttl=3650 is ten years, etc.

Basic Mode Data Types

Any data type can be stored in a table, such as GIF, JPEG, PDF, XML, JSON, text, or any other data type. When the media type on the request is 'text', the information is translated between EBCDIC and ASCII, enabling access to the table information from all platforms. All other media types in the request may be processed as binary objects with the client being responsible for presentation of the different data formats.

Query Mode Features

To define a table as Query Mode enabled, a data model is created, which defines field names, field column, field length, field type, field security level and optionally multiple secondary column indexes. A table that is defined as Query Mode enabled is still accessible in Basic Mode with all of the same Basic Mode features and functionality.

Query Mode Data Model (Field, View and Column Indexes)
A table data model may have the following parameters to define the fields within a row:

Field ID number: When this entry is a field, the ID number will be set to zeroes.
  When this entry is a column index, the ID number will range from 1 thru 256.
Field column: This is the beginning column number within the row.
  The minimum column is one and the maximum is 31,999,999
  As the maximum row size is 3.2 mb.
Field length: This is the length of the actual field, which has a minimum of 1 and a maximum of 256 kb.
Field type: This field describes the content as either numeric or alphanumeric.
Field security: This field assigns the field level security number, ranging from 01 thru 32. Security level 0 is reserved for row level access.
Field name: This is the name for the field, which is referenced in query commands.

Also included in the Query Mode data model is a parameter called 'View'. A view is a name (maximum of sixteen bytes) that is a set of fields and is referenced in query commands. For example, a table called CustomerInformation the following fields defined:
AccountNumber, FirstName, MiddleName, LastName, StreetNumber, StreetName, City, State, ZipCode, ZipExt, PhoneNumber, Age and many other fields.
A view called 'Name' could be defined and assigned field names FirstName, MiddleName, LastName.
A view called 'Address' could be defined and assigned field names StreetNumber, StreetName, City, Zipcode, ZipExt.

When a GET request is made for a view called 'Name', the query command would state:
SELECT,(VIEW {Name}),(WHERE {AccountNumber=123})
The message content returned would include FirstName, MiddleName, LastName.
When a GET request is made for each field individually, the query command would state:
SELECT,(FIELDS {FirstName}, {MiddleName}, {LastName}),(WHERE{AccountNumber=123})
The message content returned would include FirstName, MiddleName, LastName.

Another feature of Query Mode is the ability to create multiple secondary column indexes. A column index enables a SELECT to reference a row using an index other than the primary key.

Using the table called CustomerInformation another field called PhoneNumber could be assigned as a column index. The primary key always has Field ID number of 1, so in this example, PhoneNumber would be assigned Field ID number of 2. A GET request could then be made using the following query command:
SELECT,(FIELDS {FirstName}, {MiddleName}, {LastName}),
(WHERE{PhoneNumber=800-555-1212})
The message content returned would include AccountNumber, FirstName, MiddleName, LastName. When issuing a SELECT using a column index, the primary key is always included as the first field in the message content.

Query Mode Data Retention

Another feature of Query Mode is the ability to set record retention at the row level. Each POST and PUT request has the option in the query command to specify a retention period or 'time to live' (TTL). The minimum TTL is one day and the maximum is 100 years, with the default (when not specified) as seven years. The TTL must be numeric with the range specified in days. For example (TTL{1}) is one day, (TTL{365}) is one year and (TTL{3650}) is ten years.

To specify retention period on a query command, the TTL parameter would be specified. For example, a PUT request in the query command would state:
UPDATE,(FIELDS {Age=29}), (WHERE{AccountNumber=123}),(TTL{3650})

Query Mode Field Level Security

In Query Mode, access to information on each row of information is achieved by using a full or precise primary key or any of the secondary column indexes. The UserID on each request is extracted thru either the HTTP or SOAP header and authenticated using the RACF (or equivalent) security manager. Each table has its own security structure where a list of UserIDs are defined with their appropriate level of security access. There are three groups of security for each UserID in Query Mode, which are Read, Update and Delete access. Each group (Read, Update, Delete) has 32 levels of security access.

For example, the CustomerInformation table has a security structure with four UserIDs, which are SysAdmin, User01, User02 and User03, and a data model with the following fields defined:
AccountNumber, FirstName, MiddleName, LastName, StreetNumber, StreetName, City, State, ZipCode, ZipExt, PhoneNumber, Age, DOB, SSN and CreditCard.
The DOB is assigned security level 02, SSN with security level 03 and CreditCard with security level 04. All of the other fields in the data model are defined with security level 01. Also, remember, row level access is defined as security level 0.

The security structure could be defined as follows:
SysAdmin, Read, 0, 1, 2, 3, 4, 5, 6, . . . 32
SysAdmin, Update, 0, 1, 2, 3, 4, 5, 6, . . . 32
SysAdmin, Delete, 0, 1, 2, 3, 4, 5, 6, . . . 32
User01, Read, 1
User01, Update, 1
User01, Delete,
User02, Read, 1
User02, Update, 1
User02, Delete, 1
User03, Read, 0, 1, 2, 3, 4
User03, Update, 0, 1, 2, 3, 4
User03, Delete, In this example, CustomerInformation contains sensitive information, such as DOB, SSN and CreditCard, therefore access to the row using Basic Mode is only allowed special users.

SysAdmin, is authorized to Read, Update and Delete the entire row in Basic Mode. Also, SysAdmin is authorized for all 32 security levels to Read, Update and Delete fields defined in the Data Model for Query Mode.

User01 can read and update all fields assigned to security level 01, however is not allowed to delete these fields (SL01). User01 is not allowed to access DOB, SSN and CreditCard in Query Mode and is not allowed to use Basic Mode for row level access.

User02 can read, update and delete all fields assigned to security level 01. User02 is not allowed to access DOB, SSN and CreditCard in Query Mode and is not allowed to use Basic Mode for row level access.

User03 can read and update the entire row in Basic Mode, and can read and update security levels 01, 02, 03 and 04, giving access to DOB, SSN and CreditCard. User03 does not have delete authority for row level in Basic Mode or delete authority in Query Mode.

All POST, GET, PUT and DELETE requests are required to use HTTPS and SSL/TLS. The exception to this rule is for GET requests. Another feature in the security structure is a setting called 'Query Mode Read Only', which when set to 'yes' allows GET requests for a table to be accessed thru HTTP without a UserID or Password. When this setting is set to 'no', GET requests are required to use HTTPS and SSL/TLS.

Offload Complex Queries

The Offload feature allows for complex queries and table scans to be processed asynchronously and the results made available for client applications to consume. The client would issue the GET request and specify in the SELECT query command using multiple WHERE statements and requesting either multiple fields or the entire row, with the message content written to a file. When the WHERE statement specifies a field name, instead of only column indexes, a table scan is performed, otherwise only index scans are performed.

The response would be returned immediately to the client and would contain the file name where the results of the query will be written, then an asynchronous process will be attached to perform the request.

For example, when a GET request is made for an offload process for specific fields to be selected, the query command would state:
SELECT, (FIELDS {FirstName}, {MiddleName}, {Last-Name}, {Age}),
(WHERE{AccountNumber=12*}, {PhoneNumber=479}, {Age=32}, {DOB=1968*}),
(OPTIONS {MODE=OFFLINE}, {ROWS=1000})

Alternatively, the entire row can be written to the file (instead of selected fields), by omitting the FIELDS parameter, as depicted in the following query command:
SELECT,
(WHERE{AccountNumber=12*}, {PhoneNumber=479}, {Age=32}, {DOB=1968*}), (OPTIONS {MODE=OFFLINE})
SELECT Options Several options are available on SELECT statements. The options that may be available include:
FORMAT This describes the format of the data being returned.
  FIXED (fixed byte length)
  XML (XML formatted tags from the data model fields
  DELIMITED (delimiter character, with default being |)
  The default FORMAT is FIXED
DISTINCT Are duplicate records (rows) to be returned
  YES (Return duplicate records)
  NO (Do not return duplicate records, first record only)
  Default is NO
MODE SELECT results returned synchronously or asynchronously
  ONLINE (Return results synchronously)
  OFFLINE (Write results to a file asynchronously)
  The default is ONLINE
SORT Sort the results on a particular field, instead of primary key.
  The sort will be in ascending order. If SORT is not Specified, results are returned in primary key order
ROWS Specifies the maximum number of rows to be processed on a SELECT request. If ROWS=100 is specified and 1000 ROWS are in the table, only the first 100 will be processed.
  ROWS=0 processes all selected rows.
  The default is ROWS=0

An example of the OPTIONS parameter on a SELECT is as follows:
SELECT,(FIELDS{FirstName},{MiddleName},{Last-Name}),
  (WHERE {AccountNumber=123}),
  (JOIN {Table=HobbyCenter}),
  (FIELDS {StoreName}, {PhoneNumber}),
  (WHERE{ZipCode=73753}),
  (OPTIONS{FORMAT=XML},{DISTINCT=NO}, {ROWS=100}),
  (WITH{UR})

Table Join Feature

As a cloud-based service, each REST or SOAP request directly accesses the database table for which the URL was created during provisioning. All POST (Insert), GET (Select), PUT (Update) and DELETE (Delete) requests received during a Query Mode command are applied to the intended database table and does not allow for the query command to specify the table name.

Another feature that we provide in Query Mode is the ability to JOIN requests with another table. Using the CustomerInformation table and introducing another table called HobbyCenter, which has information about hobby and entertainment information. A query command to processed by the CustomerInformation service could issue the following query command:
SELECT,(FIELDS {FirstName}, {MiddleName}, {Last-Name}),
  (WHERE {AccountNumber=123}),
  (JOIN {Table=HobbyCenter}),
  (FIELDS {StoreName}, {PhoneNumber})
  (WHERE{ ZipCode=72753})

The message content returned would include FirstName, MiddleName and LastName from CustomerInformation table and StoreName and PhoneNumber from HobbyCenter table.

The table JOIN also supports Insert, Update and Delete requests, which are coordinated by the initial table manager. For example, a request could issue the following query command:

UPDATE,(FIELDS {PhoneNumber=479-555-1212}),
   (WHERE {CustomerNumber=123}),
   (JOIN {Table=HobbyCenter}),
   (FIELDS(PhoneNumber=479-555-1212}),
   (WHERE {AccountNumber=987})

In this example, the PhoneNumber is changed in both CustomerInformation and HobbyCenter tables.

The same rules apply for field level security when specifying a JOIN request. After the UserID and Password are authenticated by the security manager and field level security is performed using the security structure, the request is then issued to the table name in the JOIN request. The UserID and Password received in the request will be sent on the JOIN request, where the security manager performs authentication, then field level security is performed using the security structure of the table in the JOIN request.

Trigger Events

Trigger event points can be defined for a table to perform a variety of tasks, such as synchronization with other data base services, logging services, publish-subscribe services, etc. Trigger event points can be defined as synchronous or asynchronous and can invoke SOAP, REST or messaging protocols.

Atomic Transaction Processing

There are three aspects of processing with the database services that will span servers, clusters and even Data Centers:

Replication of resources in Active/Standby and Active/Active configuration
   Table JOIN
   Trigger events Changes made to recoverable resources in each system need to be coordinated so the distributed Unit of Work (UOW) can either commit all the changes successfully or back them all out. This atomicity of recoverable changes is one of the tenets of the ACID programming model, which can be stated as:

Atomicity: A UOW's entire sequence of recoverable actions must be either completed or aborted; it cannot be partially successfully
   Consistency: A UOW takes recoverable resources from one consistent state to another
   Isolation: Although multiple UOW's may execute concurrently, each must be unaware of other concurrently executing ones. A UOW's effect must be not be visible until it's committed
   Durability: After a UOW completes successfully, committed changes will persist and must be capable of surviving a system failure According to one implementation, all replication, JOIN and trigger events extend these ACID concepts to provide a method of coordinating such distributed work in the scope of a web service between NoSQL, KVS database servers, clusters and Data Centers. These web services involved in replication, JOIN and trigger events may be defined as Atomic Transactions, insuring that updates to the database tables are not committed or backed out until the web service is instructed to do so.

Appendix A shows and describes additional embodiments of a database system according to aspects of the present invention. Appendix A forms an integral part of the present application and aspects may be used alone or in combination with other features.

Example Computer Implementations

Processes described above are merely illustrative embodiments of systems that may be used to process database service requests. Such illustrative embodiments are not intended to limit the scope of the present invention, as any of numerous other implementations for performing the invention. None of the claims set forth below are intended to be limited to any particular implementation of a database system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to perform database functions according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as processor savailable from the Intel Corporation. Many other processors are available. Such a processor usually executes an operating system which may be, for example, the Windows 7 or Windows 8 operating systems available from the Microsoft Corporation, MAC OS X Snow Leopard, MAC OS X Lion operating systems available from Apple Computer, iOS, Blackberry OS, Windows Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the DB2 database, SQL databases, the mongoDB database, etc.), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 11:
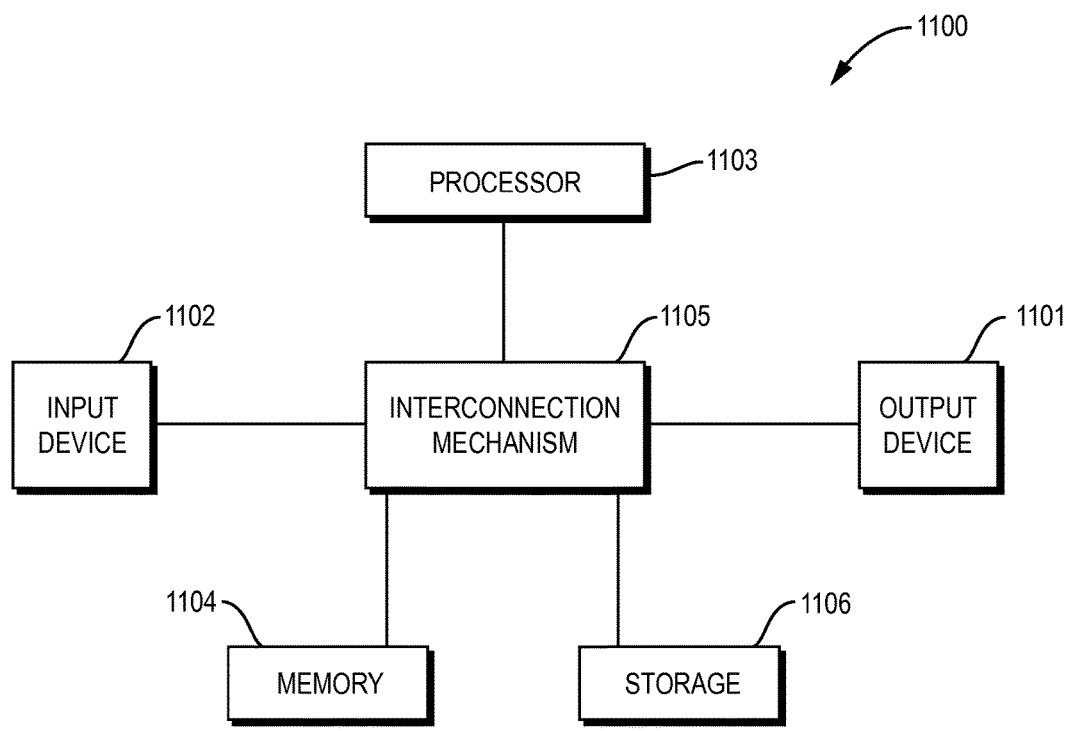
FIG. 11 shows an example computer system upon which various embodiments of the present invention may be practiced.
Figure 12:
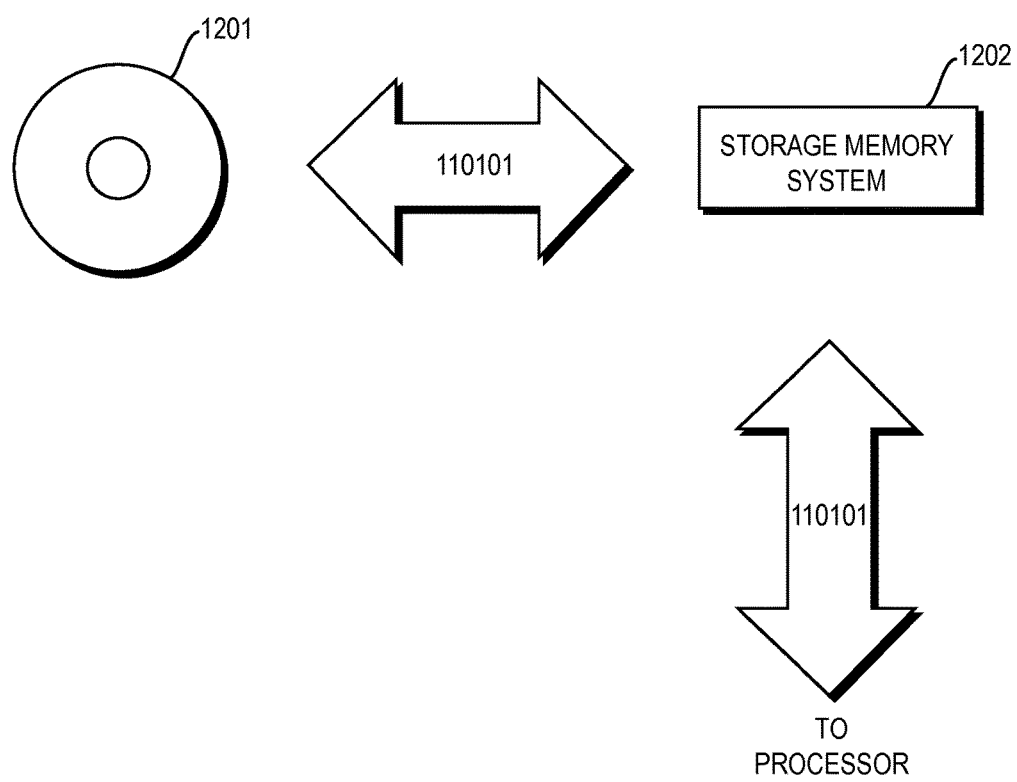
FIG. 12 shows an example storage system capable of implementing various aspects of the present invention.

Any number of systems of system 100 may be implemented on a computer system described below in relation to FIGS. 11 and 12. In particular, FIG. 11 shows an example computer system 1100 used to implement various aspects. FIG. 12 shows an example storage system that may be used.

System 1100 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 1100 such as that shown in FIG. 11. The computer system 1100 may include a processor 1103 connected to one or more memory devices 1104, such as a disk drive, memory, or other device for storing data. Memory 1104 is typically used for storing programs and data during operation of the computer system 1100. Components of computer system 1100 may be coupled by an interconnection mechanism 1105, which may include one or more busses (e.g., between components that are integrated within a same machine) and/or a network (e.g., between components that reside on separate discrete machines). The interconnection mechanism 1105 enables communications (e.g., data, instructions) to be exchanged between system components of system 1100. Computer system 1100 also includes one or more input devices 1102, for example, a keyboard, mouse, scanner, trackball, microphone, touch screen, and one or more output devices 1101, for example, a printing device, display screen, and/or speaker. The system may also include any specialized components depending on the application, including any barcode reader, magnetic stripe reader, receipt printer, hand-held or fixed scanners, pin entry devices (PED), or other device types. In addition, computer system 1100 may contain one or more interfaces (not shown) that connect computer system 1100 to a communication network (in addition or as an alternative to the interconnection mechanism 1105).

The storage system 1106, shown in greater detail in FIG. 12, typically includes a computer readable and writeable nonvolatile recording medium 1201 in which signals are stored that define a program to be executed by the processor or information stored on or in the medium 1201 to be processed by the program. The medium may, for example, be a disk or flash memory. Storage system 1106 may also include logical storage comprising a number of physical storage elements. Typically, in operation, the processor causes data to be read from the nonvolatile recording medium 1201 into another memory 1202 that allows for faster access to the information by the processor than does the medium 1201. This memory 1202 is typically a volatile, random access memory such as a dynamic random access memory (DRAM) or static memory (SRAM). It may be located in storage system 1106, as shown, or in memory system 1104, not shown. The processor 1103 generally manipulates the data within the integrated circuit memory 1104, 1202 and then copies the data to the medium 1201 after processing is completed. A variety of mechanisms are known for managing data movement between the medium 1201 and the integrated circuit memory element 1104, 1202, and the invention is not limited thereto. The invention is not limited to a particular memory system 1104 or storage system 1106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component. Although computer system 1100 is shown by way of example as one type of computer system upon which various aspects of the invention may be practiced, it should be appreciated that aspects of the invention are not limited to being implemented on the computer system as shown in FIG. 11. Various aspects of the invention may be practiced on one or more computers having a different architecture or components that that shown in FIG. 11.

Computer system 1100 may be a general-purpose computer system that is programmable using a high-level computer programming language. Computer system 1100 may be also implemented using specially programmed, special purpose hardware. In computer system 1100, processor 1103 is typically a commercially available processor such as the well-known Pentium, Core, Core Vpro, Xeon, or Itanium class processors available from the Intel Corporation. Many other processors are available. Such a processor usually executes an operating system which may be, for example, the Windows XP, Windows Vista, Windows 7 or Windows 8 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 or 8 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for processing database requests, the system comprising:
   a server including a processor, configured to receive and process database requests, the server comprising a plurality of components comprising:

a plurality of virtual computer systems adapted to receive database requests including full keys or generic keys;

a logical storage system coupled to the plurality of virtual computer systems, wherein each of the plurality of virtual computer systems shares a common storage that is adapted to store the received database requests;

a request handler element adapted to distribute a first database request to at least one of the plurality of virtual computer systems for processing;

a component of the plurality of components adapted to set record retention at a row level, wherein the component adapted to set record retention at a row level is responsive to a specification of a time to live value within the first database request, wherein the at least one of the plurality of virtual computing systems is configured to (i) receive a Uniform Resource Identifiers (URI) associated with the first database request, including a generic key, (ii) retrieve one or more records associated with the generic key, (iii) in response to retrieving a plurality of records associated with the generic key, receive an HTTP Status Text including a full key corresponding to at least one record of the plurality of records stored in the logical storage system in response to processing the first database request, (iv) move the full key from the HTTP Status Text to the URI to access the record using the full key included in the HTTP Status Text, wherein the at least one of the plurality of virtual computing systems is configured to receive a second database request, determine the second database request is of a certain type, asynchronously process the second database request, write results of processing the second database requests to a file and transmit a response indicating the file name.

2. The system according to claim 1, wherein the database requests include at least one of a group comprising:
   a representational state transfer (REST) service request; and
   a Simple Object Access Protocol (SOAP) service request.

3. The system according to claim 1, wherein the database requests include at least one of a group of requests comprising:
   a POST request;
   a GET request;
   a PUT request; and
   a DELETE request.

4. The system according to claim 3, wherein the database is accessed in a read-only mode wherein the GET request is accessed using HTTP without a username/password information.

5. The system according to claim 3, wherein the database is accessed responsive to the database requests using HTTPS and Secure Sockets Layer/Transport Layer Security (SSL/TLS).

6. The system according to claim 1, wherein the server configured to receive and process database requests is operable in at least one of a group of operating modes, the group comprising:
   an active/single mode;
   an active/standby mode; and
   an active/active mode.

7. The system according to claim 1, wherein the server configured to receive and process database requests is operable in at least one of a group of operating modes, the group comprising:
   a basic mode; and
   a query mode.

8. The system according to claim 7, wherein in the basic mode, access to a row of information in the database is performed using a full key value.

9. The system according to claim 7, wherein in the basic mode, a table is browsed sequentially using a full or generic key value.

10. The system according to claim 7, further comprising a component configured to return a set of database fields from the database responsive to a view indicator defining the set of database fields.

11. The system according to claim 10, wherein the view information is specified within at least one of the plurality of received database requests.

12. The system according to claim 7, further comprising a component configured to set record retention at a row level of the database.

13. The system according to claim 12, wherein record retention information is specified within at least one of the plurality of received database requests.

14. The system according to claim 12, wherein record retention information is specified within at least one of the plurality of received database requests.

15. The system according to claim 7, further comprising a component configured to set security at a field level of the database.

16. The system according to claim 15, wherein the database includes a data structure specifying one or more users having field level access to information stored in the database.

17. The system according to claim 16, wherein the database is adapted to control access to the database responsive to the received database requests at a field level of the database based on one or more user identifiers.

18. The system according to claim 7, further comprising a component configured to perform a query of the database in an offload processing mode responsive to an indicator defining the offload processing mode.

19. The system according to claim 7, further comprising a component responsive to a database request that does not specify a table name.

20. The system according to claim 7, further comprising a component responsive to a database request that joins information from a specified table.

21. The system according to claim 1, wherein the database request includes a request type identifier.

22. The system according to claim 21, wherein the request type identifier includes at least one of a group of request type identifiers, the group comprising:
   an indicator that specifies that the database request includes a precise key; and
   an indicator that specifies that the database request includes a generic key.

23. The system according to claim 22, wherein the indicator that specifies that the database request includes the generic key also indicates that database records retrieved from the database by generating a query including at least one operator of a group of operators and the generic key, the group of operators comprising:
   a greater than or equal to relationship operator;
   a greater than relationship operator;
   a less than or equal to relationship operator; and
   a less than relationship operator.

24. The system according to claim 1, further comprising a component responsive to a trigger event that defines a database operation.

25. The system according to claim 24, wherein the component responsive to the trigger event may perform at least one of a group comprising a synchronization of data with another database service, a logging of data to a logging service, a receipt of information to the database, and a publication of data to an external destination.

26. The system according to claim 24, wherein the trigger event may be specified as a synchronous or an asynchronous operation.

27. The system according to claim 1, wherein the database is a NoSQL key/value store database.

28. The system according to claim 1, further comprising a load balancing element adapted to distribute the database requests among a plurality of server systems.

29. The system according to claim 1, wherein the plurality of virtual computer systems are located within a partition.

30. The system according to claim 29, wherein a database application is assigned to a particular partition.

31. The system according to claim 1, further comprising transaction server components that are adapted to process database transactions.

32. The system according to claim 1, wherein the logical storage system further comprises a common database shared by the plurality of virtual servers upon which database requests are transacted.

33. The system according to claim 1, further comprising an entity that monitors an expiration of a database record associated with at least one database request.

34. The system according to claim 33, further comprising corresponding entities that execute among at least two of the plurality of virtual computer systems, the entities being adapted to compare timestamps associated with the database record associated with the at least one database request.

35. The system according to claim 34, wherein the at least two of the plurality of virtual computer systems execute within separate computer systems.

36. The system according to claim 33, wherein the entity is adapted to delete the database record associated with the at least one database request.

37. The system according to claim 1, wherein at least two of the virtual computer systems are located in different data centers.

38. A method for processing database requests, the method comprising out of:
  receiving, by a load sharing entity, a plurality of database requests including full keys or generic keys, from one or more client systems;
  storing, in a common storage location, the received plurality of database requests;
  assigning at least one virtual computer system to process at least a first one of the plurality of database requests stored in the common storage location;
  setting record retention at a row level;
  including a time to live value within the at least first one of the database requests;
  receiving, via the at least one virtual computer system, a Uniform Resource Identifiers (URI) associated with the first one of the database requests, including a generic key;
  retrieving, via the at least one virtual computer system, a plurality of records associated with the generic key;
  in response to retrieving the plurality of records associated with the generic key, receiving, via the at least one virtual computer system, an HTTP Status Text including a full key corresponding to at least one record of the plurality of records stored in the common storage system in response to processing the at least first one of the database requests,
  moving, via the at least one virtual computer system, the full key from the HTTP Status Text to the URI to access the at least one record using the full key included in the HTTP Status Text;
  providing, via the at least one virtual computer system, a first response including the at least one record, to the one or more client systems that generated the at least first one of the plurality of database requests;
  receiving, via the at least one virtual computer system, an at least second database request;
  determining, via the at least one virtual computer system, the at least second database request is of a certain type;
  asynchronously processing, via the at least one virtual computer system, the at least second database request;
  writing, via the at least one virtual computer system, results of processing the at least second, via the at least one virtual computer system, database requests to a file; and
  transmitting, via the at least one virtual computer system, a second response indicating the file name the one or more client systems that generated the at least second one of the plurality of database requests.

39. The method according to claim 38, wherein the at least one of the plurality of database requests includes at least one of a group comprising:
  a representational state transfer (REST) service request; and
  a Simple Object Access Protocol (SOAP) service request.

40. The method according to claim 38, wherein the database requests include at least one of a group of requests comprising:
  a POST request;
  a GET request;
  a PUT request; and
  a DELETE request.

41. The method according to claim 40, further comprising an act of accessing the database in a read-only mode wherein the GET request is accessed using HTTP without a username/password information.

42. The method according to claim 40, further comprising an act of accessing the database responsive to receiving database requests using HTTPS and Secure Sockets Layer/Transport Layer Security (SSL/TLS).

43. The method according to claim 38, further comprising an act of operating the server configured to receive and process database requests in at least one of a group of operating modes, the group comprising:
  an active/single mode;
  an active/standby mode; and
  an active/active mode.

44. The method according to claim 38, further comprising an act of operating the server to receive and process database requests, the server being operable in at least one of a group of operating modes, the group comprising:
  a basic mode; and
  a query mode.

45. The system according to claim 44, wherein in the basic mode, access to a row of information in the database is performed using a full key value.

46. The method according to claim 44, wherein in the basic mode, browsing a table sequentially using a full or generic key value.

47. The method according to claim 44, further comprising an act of returning a set of database fields from the database responsive to a view indicator defining the set of database fields.

48. The method according to claim 47, wherein the view information is specified within at least one of the plurality of received database requests.

49. The method according to claim 44, further comprising an act of setting record retention at a row level of the database.

50. The method according to claim 49, wherein record retention information is specified within at least one of the plurality of received database requests.

51. The method according to claim 49, further comprising an act of setting record retention responsive to received record retention information within at least one of the plurality of received database requests.

52. The method according to claim 44, further comprising an act of setting security at a field level of the database.

53. The method according to claim 52, wherein the database includes a data structure specifying one or more users having field level access to information stored in the database.

54. The method according to claim 53, wherein the database is adapted to control access to the database responsive to the received database requests at a field level of the database based on one or more user identifiers.

55. The method according to claim 44, further comprising an act of performing a query of the database in an offload processing mode responsive to an indicator defining the offload processing mode.

56. The method according to claim 44, further comprising an act of responding to a database request that does not specify a table name.

57. The method according to claim 44, further comprising an act of responding to a database request that joins information from a specified table.

58. The method according to claim 38, wherein the database request includes a request type identifier.

59. The method according to claim 58, wherein the request type identifier includes at least one of a group of request type identifiers, the group comprising:

an indicator that specifies that the database request includes a precise key; and an indicator that specifies that the database request includes a generic key.

60. The method according to claim 59, wherein the indicator that specifies that the database request includes the generic key also indicates that database records retrieved from the database are to be retrieved by generating a query including at least one operator of a group of operators specified in the database request and the generic key, the group of operators comprising:

a greater than or equal to relationship operator;

a greater than relationship operator;

a less than or equal to relationship operator; and a less than relationship operator.

61. The method according to claim 38, further comprising an act of responding to a trigger event that defines a database operation.

62. The method according to claim 61, further comprising an act of performing, responsive to the trigger event, at least one of a group comprising a synchronization of data with another database service, a logging of data to a logging service, a receipt of information to the database, and a publication of data to an external destination.

63. The method according to claim 61, wherein the trigger event may be specified as a synchronous or an asynchronous operation.

64. The method according to claim 38, wherein the database is a NoSQL key/value store database.

65. The method according to claim 38, further comprising an act of distributing the plurality of database requests among a group of virtual computer systems.

66. The method according to claim 65, wherein the group of virtual computer systems are located within a partition.

67. The method according to claim 66, further comprising an act of assigning a database application to the partition.

68. The method according to claim 66, further comprising an act of sharing, by the group of virtual computer systems, the common storage location that stores the plurality of database requests.

* * * * *